(12) United States Patent
Walters et al.

(10) Patent No.: US 9,325,753 B2
(45) Date of Patent: Apr. 26, 2016

(54) USER INTERFACE FOR CREATING AND ADMINISTERING A USER GROUP, AND METHODS OF OPERATING SUCH

(71) Applicant: Sorenson Communications, Inc., Salt Lake City, UT (US)

(72) Inventors: Lane Walters, American Fork, UT (US); Merle L. Walker, Sandy, UT (US); Tara Ault, Lehi, UT (US); Jarret M. Gill, Sandy, UT (US)

(73) Assignee: SORENSON COMMUNICATIONS, INC., Salt Lake City, UT (US)

( * ) Notice: Subject to any disclaimer, the term of this patent is extended or adjusted under 35 U.S.C. 154(b) by 252 days.

(21) Appl. No.: 13/840,659

(22) Filed: Mar. 15, 2013

(65) Prior Publication Data

US 2014/0282095 A1 Sep. 18, 2014

(51) Int. Cl.
*G06F 19/00* (2011.01)
*H04L 29/06* (2006.01)
*H04W 4/08* (2009.01)
*H04L 29/08* (2006.01)

(52) U.S. Cl.
CPC .......... *H04L 65/403* (2013.01); *H04L 67/1046* (2013.01); *H04L 67/1059* (2013.01); *H04W 4/08* (2013.01)

(58) Field of Classification Search
None
See application file for complete search history.

(56) References Cited

U.S. PATENT DOCUMENTS

| | | | |
|---|---|---|---|
| 5,619,555 A * | 4/1997 | Fenton et al. | 379/88.11 |
| 5,815,563 A | 9/1998 | Ardon et al. | |
| 5,923,733 A | 7/1999 | Binns et al. | |
| 5,930,723 A | 7/1999 | Heiskari et al. | |
| 6,018,668 A | 1/2000 | Schmidt | |
| 6,570,963 B1 * | 5/2003 | Watson et al. | 379/52 |
| 6,574,655 B1 | 6/2003 | Libert et al. | |
| 6,993,355 B1 | 1/2006 | Pershan | |
| 7,050,861 B1 | 5/2006 | Lauzon et al. | |
| 7,283,833 B2 | 10/2007 | Fukui et al. | |
| 7,526,306 B2 | 4/2009 | Brems et al. | |
| 7,801,953 B1 | 9/2010 | Denman et al. | |
| 7,853,703 B1 | 12/2010 | McBarron et al. | |
| 8,223,930 B2 | 7/2012 | Narang et al. | |
| 8,289,900 B2 | 10/2012 | DuMas et al. | |

(Continued)

FOREIGN PATENT DOCUMENTS

| | | |
|---|---|---|
| EP | 2 104 324 A2 | 9/2009 |
| EP | 2 369 883 A1 | 9/2011 |

(Continued)

OTHER PUBLICATIONS

Patrick, "Receiving calls on both iphone and PC simultaneous . . . ", website: "http://community.skype.com/t5/iOS-archive/Receiving-calls-on-both-iphone-and-PC-simultaneously/td-p/8474141", date: Sep. 27, 2011.*

(Continued)

*Primary Examiner* — Jeffrey A Gaffin
*Assistant Examiner* — Nhat-Huy T Nguyen
(74) *Attorney, Agent, or Firm* — TraskBritt

(57) ABSTRACT

Devices and methods for creating and administering a user group with a user interface of a communication device. One or more servers are configured to address the communication device with an individual unique identifier assigned to the communication device. The one or more servers are also configured to address the communication device with a group unique identifier assigned to the new user group.

20 Claims, 22 Drawing Sheets

(56) References Cited

U.S. PATENT DOCUMENTS

| | | |
|---|---|---|
| 8,358,765 B1 | 1/2013 | Whitten et al. |
| 8,520,807 B1 | 8/2013 | Hewinson |
| 2002/0057783 A1 | 5/2002 | Kredo et al. |
| 2003/0009592 A1 | 1/2003 | Stahura |
| 2003/0041138 A1 | 2/2003 | Kampe et al. |
| 2003/0086554 A1 | 5/2003 | Krimstock et al. |
| 2003/0093537 A1 | 5/2003 | Tremlett et al. |
| 2003/0097466 A1 | 5/2003 | Sung |
| 2003/0125072 A1* | 7/2003 | Dent .................. 455/551 |
| 2004/0081136 A1 | 4/2004 | Brown et al. |
| 2004/0137882 A1 | 7/2004 | Forsyth |
| 2004/0223598 A1 | 11/2004 | Spiridellis |
| 2005/0267876 A1* | 12/2005 | Watanabe et al. .......... 707/3 |
| 2006/0099983 A1 | 5/2006 | Kim |
| 2006/0230043 A1 | 10/2006 | Sumner-Moore |
| 2007/0167141 A1 | 7/2007 | Akiyama |
| 2007/0232342 A1 | 10/2007 | Larocca |
| 2007/0280464 A1 | 12/2007 | Hughes et al. |
| 2008/0002671 A1 | 1/2008 | Nagai |
| 2008/0037745 A1 | 2/2008 | Ramamoorthy et al. |
| 2008/0037748 A1* | 2/2008 | Jefferson et al. ........ 379/202.01 |
| 2008/0064350 A1 | 3/2008 | Winkler |
| 2008/0119172 A1 | 5/2008 | Rao et al. |
| 2008/0189351 A1 | 8/2008 | Nemoto et al. |
| 2008/0288494 A1* | 11/2008 | Brogger et al. ............ 707/7 |
| 2009/0013380 A1 | 1/2009 | Chandrasiri et al. |
| 2009/0034696 A1 | 2/2009 | Ramanathan |
| 2009/0106199 A1 | 4/2009 | Wang |
| 2009/0238356 A1 | 9/2009 | Kojo et al. |
| 2010/0121666 A1* | 5/2010 | Niazi ..................... 705/8 |
| 2010/0136980 A1 | 6/2010 | Linquist et al. |
| 2010/0184454 A1 | 7/2010 | Luft et al. |
| 2011/0135077 A1 | 6/2011 | Wengrovitz |
| 2011/0142221 A1 | 6/2011 | Tofighbakhsh et al. |
| 2011/0199915 A1 | 8/2011 | Santhanam et al. |
| 2011/0270880 A1 | 11/2011 | Jesse et al. |
| 2011/0317684 A1 | 12/2011 | Lazzaro et al. |
| 2012/0028618 A1 | 2/2012 | Goel et al. |
| 2012/0102073 A1 | 4/2012 | Patel |
| 2012/0220325 A1 | 8/2012 | Zhou et al. |
| 2012/0257756 A1 | 10/2012 | Huang et al. |
| 2012/0296756 A1 | 11/2012 | Shah |
| 2012/0314849 A1 | 12/2012 | LeBlanc et al. |
| 2013/0010708 A1 | 1/2013 | Abraham et al. |
| 2013/0021957 A1 | 1/2013 | Fang et al. |
| 2013/0070912 A1 | 3/2013 | Parandekar et al. |
| 2013/0100870 A1 | 4/2013 | Xie et al. |
| 2013/0223318 A1 | 8/2013 | Liu et al. |
| 2014/0148136 A1 | 5/2014 | Thange |
| 2014/0267580 A1 | 9/2014 | Parent et al. |
| 2014/0272814 A1 | 9/2014 | Parent et al. |
| 2014/0280562 A1 | 9/2014 | Shields |
| 2014/0282041 A1 | 9/2014 | Walker et al. |

FOREIGN PATENT DOCUMENTS

| | | |
|---|---|---|
| WO | WO 00/30374 | 5/2000 |
| WO | WO 2005/101757 A1 | 10/2005 |
| WO | WO 2008/124447 A1 | 10/2008 |

OTHER PUBLICATIONS

Gregoire, "How may i get a list of all gorups I belong to in Skype", website: "http://superuser.com/questions/555370/how-may-i-get-a-list-of-all-groups-i-belong-to-in-skype?rq=1"; date: Mar. 9, 2013.*

Nations, "How to use FaceTime on the iPad", website: "http://ipad.about.com/od/iPad_Guide/ss/How-to-user-facetime-on-the-ipad_2.htm"; date: Apr. 3, 2012.*

1Number User Guide The Z, at http://www.zvrs.com/services/features/1number, at least as early as Feb. 8, 2012.

1Number Quick Start Guide, at http://www.zvrs.com/services/features/1number, at least as early as Feb. 8, 2012.

Z-20 User Guide, at http://www.zvrs.com/products/hardware/z-20/, at least as early as Feb. 7, 2012.

1Number User Guide The Z.

1Number Quick Start Guide.

Z-20 User Guide.

* cited by examiner

USER INTERFACE FOR CREATING AND ADMINISTERING A USER GROUP, AND METHODS OF OPERATING SUCH

CROSS-REFERENCE TO RELATED APPLICATIONS

This subject matter of this application is related to U.S. patent application Ser. No. 13/840,046, entitled "SYSTEMS INCLUDING AND METHODS OF OPERATING COMMUNICATION DEVICES ASSIGNED INDIVIDUAL AND GROUP IDENTITIES," filed on Mar. 15, 2013, U.S. patent application Ser. No. 13/842,401 entitled "COMMUNICATION SYSTEMS AND RELATED METHODS FOR COMMUNICATING WITH DEVICES HAVING A PLURALITY OF UNIQUE IDENTIFIERS," filed on Mar. 15, 2013, U.S. patent application Ser. No. 13/839,384, entitled "SYSTEMS, METHODS, AND DEVICES FOR REPLACING A CONTACT ENTRY CORRESPONDING TO A COMMUNICATION DEVICE WITH A CONTACT ENTRY CORRESPONDING TO A USER GROUP," filed on Mar. 15, 2013, and U.S. patent application Ser. No. 13/837,619, entitled "COMMUNICATION SYSTEMS AND RELATED METHODS FOR NOTIFYING DEVICES HAVING A PLURALITY OF UNIQUE IDENTIFIERS ABOUT MISSED COMMUNICATIONS," filed on Mar. 15, 2013, the disclosure of each of which is incorporated herein by this reference in its entirety.

FIELD

Embodiments of the present disclosure relate to administering group of communication devices with a user interface of the communication devices. More particularly, the present disclosure relates to administering groups of video communication devices for the hearing impaired.

BACKGROUND

Video phone communication systems provide visual and audio communication between two or more users during a communication session. A video phone at a first location can transmit and receive audio and video signals to and from a video phone at a second location such that participants at the first location are perceived to be present or face-to-face with participants at a second location and vice versa.

Video phone communication systems span a variety of applications. One contemplated application of a video phone system includes facilitization of a communication session of a hearing-impaired user (e.g., deaf or hard of hearing), because many individuals with significant hearing loss are not able to communicate effectively over conventional telephone systems that rely upon voice communications. The hearing-impaired user may use a video phone during a communication session to relay his or her expressions over the video phone communication system. Such video phone communication systems may facilitate communication sessions between different hearing-impaired users (e.g., video phone to video phone communication), or between a hearing-impaired user and a hearing-capable user (e.g., video phone to voice phone communication), which may be assisted through a video relay service (VRS) that may provide an interpretive (i.e., translation) service by providing a hearing-capable translator who relays the expressions of the hearing-impaired caller to a hearing-capable user on the other end of the communication session in a conventional manner, such as through the use of a voice-based dialogue conveyed over a conventional voice phone. The hearing-capable translator may also translate the voice-based dialogue back to the hearing-impaired user into expressions (e.g., American Sign Language (ASL)).

As a consequence of the recent proliferation of communication devices, many people own several communication devices capable of video calls. For example, a single user may have one or more video phones at home, one or more video phones at their place of employment, a smart phone device, a tablet computer, a laptop computer, and/or a personal computer. The user may use some or all of these communication devices for video calls.

Conventionally, each of these communication devices are individually managed and are associated with separate user accounts. As a result, a user of multiple communication devices may be required to keep track of different login credentials for each separate communication device. In addition, each individual communication device may have its own unique identifier (e.g., phone number, IP address, or other similar identifier used by a specific system) that is used to make and receive video calls. As a result, users have the burden of informing others what the unique identifiers are for each individual communication device so that others may contact them. Other people may also be inconvenienced by keeping track of several unique identifiers for the user when dialing a call to or receiving caller identification (caller ID) information from the user's various communication devices.

Also, having a plurality of different communication devices may become burdensome for the user to maintain information among each of their communication devices. For example, if a user desires to block an undesired caller, change device or account settings, access messages, or add new contacts to a directory on one of the communication devices, the action may need to be repeated separately on each of the rest of the communication devices. Furthermore, if a video call is missed on one of the communication devices, the user often only becomes aware the missed call only when the user is again in the proximity of that particular communication device.

BRIEF SUMMARY

Embodiments of the present disclosure include communication devices with a user interface and methods of operating the user interface to create a new user group.

In some embodiments, the present disclosure comprises a communication device including a user interface. The user interface may be configured to enable a user to create and administer a new user group. The communication device may be configured to communicate with one or more servers responsive to being addressed both with an individual unique identifier assigned thereto and a group unique identifier assigned thereto as a member of the new user group.

In other embodiments, the present disclosure comprises a communication system including one or more servers. The one or more servers are configured to address a communication device with an individual unique identifier assigned to the communication device. The one or more servers are also configured to create a new user group responsive to a user selecting a create new group option on a user interface of the communication device. In addition, the one or more servers are configured to address the communication device with a group unique identifier assigned to the new user group.

In other embodiments, the present disclosure comprises a method of creating a new user group. The method includes presenting a create new group option at a user interface of a communication device. The method also includes detecting a selection of the create new group option at the user interface. In addition, the method includes receiving information from a user at the user interface, the information identifying one or more other communication devices to be added to a new user group. The method also includes sending an invitation to each of the one or more other communication devices to join the new user group. Also, the method includes communicating with one or more servers responsive to being addressed both with an individual unique identifier assigned to the communication device and a group unique identifier assigned thereto as a member of the new user group.

DETAILED DESCRIPTION

Figure 1:
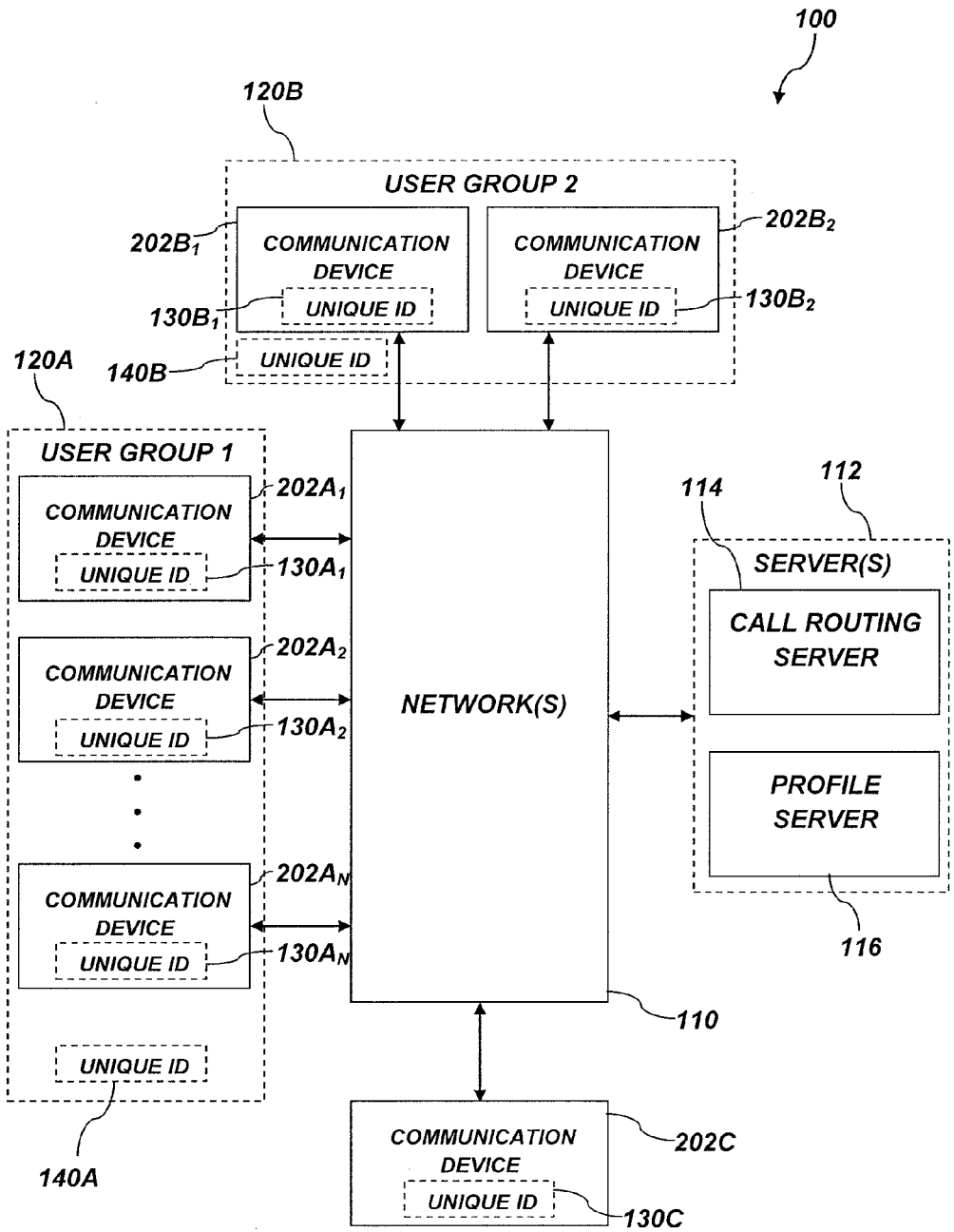
FIG. 1 is a simplified block diagram of a communication system according to an embodiment of the present disclosure.

In the following detailed description, reference is made to the accompanying drawings that form a part hereof, and in which is shown by way of illustration, specific embodiments in which the present disclosure may be practiced. These embodiments are described in sufficient detail to enable those of ordinary skill in the art to practice the present disclosure. It should be understood, however, that the detailed description and the specific examples, while indicating examples of embodiments of the present disclosure, are given by way of illustration only and not by way of limitation. From this disclosure, various substitutions, modifications, additions rearrangements, or combinations thereof within the scope of the present disclosure may be made and will become apparent to those of ordinary skill in the art.

In accordance with common practice the various features illustrated in the drawings may not be drawn to scale. The illustrations presented herein are not meant to be actual views of any particular method, device, or system, but are merely idealized representations that are employed to describe various embodiments of the present disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof. Some drawings may illustrate signals as a single signal for clarity of presentation and description. It should be understood by a person of ordinary skill in the art that the signal may represent a bus of signals, wherein the bus may have a variety of bit widths and the present disclosure may be implemented on any number of data signals including a single data signal.

The various illustrative logical blocks, modules, circuits, and algorithm acts described in connection with embodiments disclosed herein may be implemented as electronic hardware, computer software, or combinations of both. To clearly illustrate this interchangeability of hardware and software, various illustrative components, blocks, modules, circuits, and acts are described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the embodiments of the disclosure described herein.

In addition, it is noted that the embodiments may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a function, a procedure, a subroutine, a subprogram, etc. Furthermore, the methods disclosed herein may be implemented in hardware, software, or both. If implemented in software, the functions may be stored or transmitted as one or more instructions (e.g., software code) on a computer-readable medium. Computer-readable media includes both computer storage media and communication media including any medium that facilitates transfer of a computer program from one place to another.

It should be understood that any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements.

Elements described herein may include multiple instances of the same element. These elements may be generically indicated by a numerical designator (e.g. 110) and specifically indicated by the numerical indicator followed by an alphabetic designator (e.g., 110A) or a numeric indicator preceded by a "dash" (e.g., 110-1). For ease of following the description, for the most part, element number indicators begin with the number of the drawing on which the elements are introduced or most fully discussed. Thus, for example, element identifiers on a FIG. 1 will be mostly in the numerical format 1xx and elements on a FIG. 4 will be mostly in the numerical format 4xx.

Embodiments of the present disclosure include communication devices with a user interface and methods of operating the user interface to create a new user group. As discussed above, video communication systems span a variety of applications. Embodiments of the present disclosure are generally described herein with reference to a video communication system for use by hearing-impaired users. Such video communication systems may facilitate communication sessions between different hearing-impaired users (e.g., video phone to video phone communication), or between a hearing-impaired user and a hearing-capable user (e.g., video phone to voice phone communication), which may be assisted through a video relay service (VRS). It should be noted, however, embodiments of the present disclosure may include any application or environment where administering a group of communication devices with a user interface of one of the communication devices may be helpful or desirable. For example, it is contemplated that embodiments of the present disclosure may include administering communication devices for hearing-capable users.

The term "call" refers to a communication with a communication device that may be routed through a number of networks, such as, for example, a private network, the interne, a telephone system, and a VRS. The term "incoming call" refers to an incoming communication to a communication device.

The term "communication device" may refer to a specific compilation of hardware components, software components, or a combination thereof. The term "communication device" may also refer to a software based communication device that exists on a device configured to execute machine-readable commands, such as, for example a computer. As software, it should be understood that the same communication device may exist on a first device while a user accesses the communication device on the first device, and on a second device at a different time while the user accesses the communication device on the second device.

FIG. 1 is a simplified block diagram of a communication system 100 according to an embodiment of the present disclosure. The communication system 100 may include a plurality of communication devices $202A_1$, $202A_2$, ... $202A_N$, $202B_1$, $B_2$, 202C (which are collectively referred to as communication devices 202). In some instances, reference may be made to an individual communication device by the generic designation of reference numeral 202. The communication system 100 may further include one or more servers 112, with which the communication devices 202 communicate through one or more networks 110. In other words, the communication devices 202 may be configured to establish communication with the one or more servers 112 (also referred to simply as "servers" 112) through the one or more networks 110 (also referred to simply as "networks" 110). The communication devices 202 may be configured to communicate with each other over a video call with the assistance of the servers 112 as described more fully below.

Each of the communication devices 202 may be assigned an individual unique identifier 130. In some instances, reference may be made to an individual unique identifier by the general designation of reference numeral 130. For example, communication devices $202A_1$, $202A_2$, ... $202A_N$ may respectively be assigned an individual unique identifier $130A_1$, $130A_2$, ... $130A_N$. In addition, the communication devices $202B_1$, $202B_2$ may respectively be assigned an individual unique identifier $130B_1$, $130B_2$. The communication device 202C may be assigned an individual unique identifier 130C. The individual unique identifier 130 is, therefore, device-centric rather than user-centric or location-centric. In other words, an individual unique identifier 130 may be associated with an individual communication device 202. In general, individual unique identifiers 130 are not shared by multiple communication devices 202. In some respects, an individual unique identifier 130 may be similar to a telephone number. For example, the individual unique identifier 130 may be used by other people to initiate video calls with the user of the communication device 202 associated with the individual unique identifier 130. In other respects, the individual unique identifier 130 may be similar to an IP address. For example, the individual unique identifier 130 may be used to identify the communication devices 202 to the servers 112. The individual unique identifier 130 may have a numerical format, such as an IP address or a phone number (e.g., a seven digit number, a ten digit number including an area code, etc.). The individual unique identifier 130 may have an alphabetic format (e.g., a word, a phrase, etc.), an alphanumerical format, or other suitable format used to uniquely identify an individual communication device 202. As another non-limiting example, the individual unique identifier 130 may be a Media Access Control (MAC) address, which uniquely identifies a network interface of the communication device 202.

The communication devices 202 may also be associated with one or more user groups 120A, 120B (which are collectively referred to as user groups 120). In some instances, reference may be made to an individual user group by the generic designation of reference numeral 120. A user group 120 may be may be an association (i.e., grouping) of communication devices 202 that are defined as members of the user group 120, as desired by a user. A user group 120 may be associated with any number of communication devices 202 so long as there are at least two communication devices 202 grouped together by the user. By way of non-limiting example, communication devices $202A_1$, $202A_2$, ... $202A_N$ may be associated with a first user group 120A. The first user group 120A may be associated with a first user. Other communication devices $202B_1$, $202B_2$ may be associated with a second user group 120B. The second user group 120B may be associated with a second user. The communication system 100 may include communication devices 202, such as communication device 202C, which may not be associated with any user group.

The user groups 120A, 120B may respectively be assigned group unique identifiers 140A, 140B (which are collectively referred to as group unique identifiers 140). The group unique identifiers 140 are unique to a group rather than to an individual communication device 202. In other words, the group unique identifiers 140 are group-centric, such that the group unique identifiers 140 are not shared by other user groups 120. Therefore, individual communication devices 202 may be associated with both an individual unique identifier 130 and a group unique identifier 140. For example, a first communication device $202A_1$ may be associated with the individual unique identifier $130A_1$ and the group unique identifier 140A. Likewise, a second communication device 202A2 may be associated with the individual unique identifier $130A_2$ and the group unique identifier 140A. Thus, because the first communication device $202A_1$ and the second communication device $202A_2$ are part of the same user group 120A, the first communication device $202A_1$ and the second communication device $202A_2$ share the same group unique identifier 140A (but not individual unique identifiers $130A_1$, $130A_2$). Other user groups (e.g., user group 120B) may be similarly configured.

A call may be initiated to the communication devices 202 by being addressed by either its individual unique identifier 130 or its group unique identifier 140. For example, if a person (e.g., the second user) calls the first user by entering the individual unique identifier $130A_1$, only the individual communication device $202A_1$ may indicate an incoming call. If, however, a person calls the first user by entering the group unique identifier 140A assigned to the first user group 120A, each of the communication devices $202A_1, 202A_2, \ldots 202A_N$ of the first user group 120A may indicate an incoming call. An incoming call may be indicated visually, tactilely, audibly, or some other suitable indication, and combinations thereof. For hearing-impaired users, an incoming call may be indicated visually, tactilely, and combinations thereof.

As discussed above, the communication devices 202 may be associated with a user group 120 as desired by the user. In other words, the reasons for grouping the communication devices 202 within a particular user group 120 may be determined by the user acting as a group organizer, rather than any particular limitation. For example, each communication device 202 belonging to a user group 120 need not be located in close proximity to each other. By way of non-limiting example, a single user group 120 may include a communication device 202 stationed at a user's dwelling, a communication device 202 at the user's place of employment, a communication device 202 at the user's cabin, and a portable communication device 202 that may be carried anywhere. It should also be understood that two or more communication devices 202 from the same user group 120 may be located proximate to each other. By way of non-limiting example, two or more communication devices 202 from the same user group 120 may be stationed in various locations of the user's home, such as in the living room, the kitchen, the bedroom, etc.

In addition, the communication devices 202 associated with a single user group 120 may belong to two or more users. By way of non-limiting example, communication devices 202 belonging to friends, family members, co-workers, and/or roommates may be part of a single user group 120. As a result, the user acting as the group organizer may invite others to join one or more of their communication devices 202 to join his group. For example, a user group 120 may be a group of co-workers within a team or practice group, such as a technical support team.

A single user group 120 may also include several different types of communication devices 202. By way of non-limiting example, an individual user group 120 may include any one or more of a personal computer, a smart phone, a tablet computer, and a video phone. In addition, a single user group 120 may include multiple communication devices from the same device type. For example, an individual user group 120 may have a plurality of video phones within the same individual user group 120. Furthermore, a single user group 120 may include any number of communication devices 202, limited only by the capacity of the communication system 100, and/or a desire to limit services to user groups 120 of a predetermined number of communication devices 202. By way of non-limiting example, administrators of a communication system 100 may choose to limit the number of communication devices 202 that a group organizer may be allowed to include within single user group 120 to a maximum number (e.g., five, six, etc.) of allowed communication devices 202.

The communication devices 202 may be configured to enable a user to participate in video calls with the other communication devices 202 of the communication system 100. A "video call" refers to communications where real-time or quasi real-time video data is exchanged between at least two parties. A video call may also refer to an attempted initiation of a real-time or quasi real-time video data exchange. For example, a first user using a first communication device $202A_1$ may communicate with one or more other users using any of the other communication devices $202A_2, \ldots 202A_N$ associated with the first user group 120A, the communication devices $202B_1, 202B_2$ associated with the second user group 120B, another communication device 202C not associated with a user group 120, and combinations thereof.

Any one of a variety of communication devices 202 may be configured to place and receive video calls, in part, because advancements in communication device technology have substantially increased the quantity, variety, and affordability of communication devices. By way of non-limiting example, the communication devices 202 may include any of a video phone, a desktop computer, a laptop computer, a tablet computer, a smart phone, and other suitable devices. Examples of a video phone include the NTOUCH® VP video phone and the VP-200 video phone available from SORENSON COMMUNICATIONS® of Salt Lake City, Utah. More device-level detail on the communication devices 202 is discussed below with reference to FIG. 2.

The networks 110 may include an internet protocol network configured to transmit communications between each of the plurality of communication devices 202 and the servers 112, such as by using an internet protocol (IP). The networks 110 may include a wide area network (WAN), a local area network (LAN), a personal area network (PAN), and combinations thereof. In some embodiments, the servers 112 may be part of a cloud network. The networks 110 may be configured to communicate with the plurality of communication devices 202 and the servers 112 wirelessly, through a cable, and combinations thereof. Some non-limiting examples of suitable wireless communications may include "wifi," Bluetooth, and mobile wireless networks. Some non-limiting examples of suitable cables include fiber-optic cables, coaxial cables, traditional telephone cables, and Ethernet cables.

The servers 112 may be configured to provide services to the communication devices 202. For example, the servers 112 may be configured to manage calling functions, such as video call sessions and messages for the communication devices 202 of the communication system 100. In addition, the servers 112 may store and manage account information for the communication devices 202. Account information may include address books, account billings, and other information corresponding to the communication device 202 associated with the individual unique identifier 130. As non-limiting examples, the servers 112 may include a call routing server 114 and a profile server 116. Although discussed herein separately, the call routing server 114 and the profile server 116 may optionally be implemented as a single server device. Likewise, both the call routing server 114 and the profile server 116 may optionally include multiple server devices, and the various functions of the call routing server 114 and the profile server 116 may not necessarily be isolated to separate devices.

The call routing server 114 may be configured to set up and control a video call between one or more of the plurality of communication devices 202 and another of the plurality of communication devices 202, or a communication device associated with another user (not shown). The call routing server 114 may be configured to establish and control the video call through, for example, a session initiation protocol (SIP), or other suitable protocol.

The call routing server 114 may also periodically receive communications from each of the plurality of communication devices 202, including location or contact information, so that the call routing server 114 may locate and setup video call sessions with the communication devices 202 as needed. Also, the call routing server 114 may cause a particular communication device 202 to indicate an incoming call responsive to another person entering the individual unique identifier 130 assigned to the particular communication device 202. Furthermore, when the user enters the individual unique identifier 130 associated with another communication device 202 from one of the plurality of communication devices 202, the call routing server 114 may arrange for an outgoing call to be sent to the communication device 202 with the entered individual unique identifier 130 assigned thereto. In addition, when the user enters the group unique identifier 140 associated with a user group 120, the call routing server 114 may arrange for an outgoing call to be sent to each of the communication devices 202 associated with the entered group unique identifier 140 assigned thereto.

The profile server 116 may be configured to manage one or more user accounts associated with the individual unique identifiers 130. In some embodiments, the profile server 116 may also be configured to store information associated with each user account within the communication system 100. By way of non-limiting example, the profile server 116 may be configured to store an address book, a blocked caller list, a message history, text messages, video messages, a call history; personal user information, and combinations thereof, associated with each user account. In other embodiments, each of the communication devices 202 may be configured to store the information associated with the user account corresponding to the individual unique identifier 130 assigned thereto.

The servers 112 may be configured to enable the communication devices 202 to be associated with a user group 120. The user group 120 may, in some respects, function similarly to a separate communication device 102. For example, the user group 120 may be assigned a group unique identifier 140 and be associated with corresponding group account and group information, such as a group blocked caller list, a group message history, group text messages, group video messages, a group call history, a group address book (i.e., contact list), and combinations thereof, which may be stored on the profile server 116. Accessing any communication device 202 in the user group 120 may enable the user to access the group information, and communicate through the networks 110 using the group unique identifier 140 assigned to the user group 120. In some embodiments, group information may simply be a matter of the servers 112 being able to access individual communication device information that is stored for each communication device 202 to be shared with other communication devices 202 of the user group 120.

In some embodiments, where activity performed on a second communication device 202A₂ causes changes to the group information, the profile server 116 may communicate the changes in group information to the rest of the plurality of communication devices 202 belonging to the user group 120. Each of the plurality of communication devices 202 may be configured to periodically enter communication with the profile server 116 to receive updates. By way of non-limiting example, each of the plurality of communication devices 202 may be configured to enter communication with the profile server 116 approximately every five minutes (or other periodic interval) to receive updates. In some embodiments, updates may be event-driven such that certain events may cause the profile server 116 to broadcast updates to one or more of the communication devices 202. Initiation of these information updates and synchronizations may be performed by the servers 112 or the communication devices 202.

In some embodiments, the communication device 202 that is the creator of the user group 120 may have its information (e.g., lists) serve as the basis for the shared group information (e.g., shared lists). As discussed above, shared lists may include a blocked caller list, a group message history, group text messages, group video messages, a group call history, a group address book (i.e., contact list). As a result, each of these group lists may be shared and accessible (for viewing, editing, adding to, etc.) by each communication device 202. If a shared group list is changed, the change may be saved within the profile server 116. In addition, the profile server 116 may broadcast a notification to each of the communication devices 202 within the user group 120 that a change has been made to the shared group lists and that their local cache needs to be updated. The individual communication devices 202 may respond (e.g., either immediately or at their next scheduled interval) to receive the updated information to store in their local cache. In addition, there may be shared settings among group members that may be edited and shared in a similar manner. For example, shared settings may include the number of rings that occur before going to voice mail, a common voice mail message that is applied to all communication devices 202 rather than each communication device 202 having its own, among other similar settings.

In some embodiments, the profile server 116 and/or the individual communication devices 202 may retain a prior version of their individual lists and settings that existed before they joined the user group 120. As a result, when a communication device 202 leaves the user group 120, the communication device 202 may no longer have access to the shared group lists and settings and their lists may revert back to the individual state that the communication device maintained prior to joining the user group 120.

Figure 2:
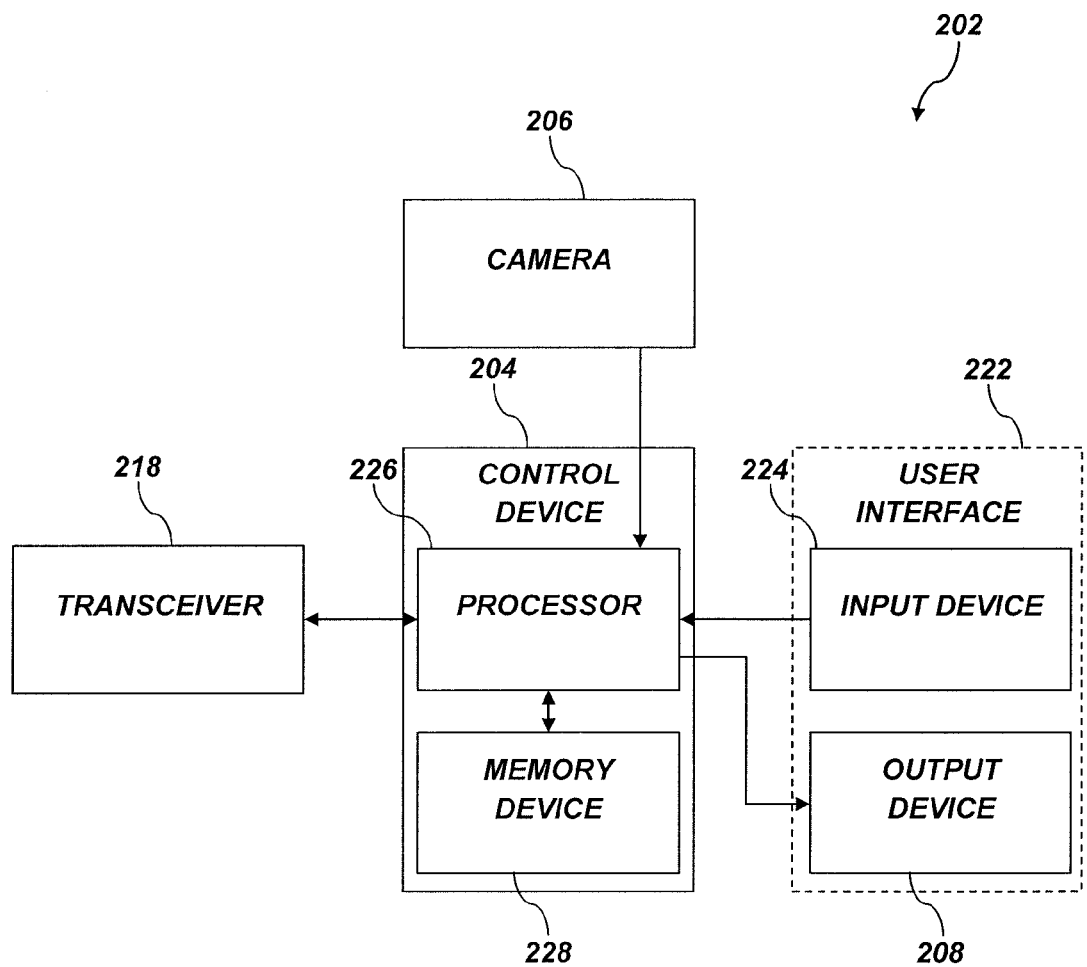
FIG. 2 is a simplified block diagram of a communication device according to some embodiments of the present disclosure.

FIG. 2 is a simplified block diagram of a computing device. The computing device may be a communication device 202 according to some embodiments of the present disclosure. The computing device may also be a server 112 according to some embodiments of the present disclosure. The computing device, whether a server 112 or a communication device 202 will be referred to in the description of FIG. 2 as a communication device 202. The communication device 202 may be one of the communication devices 202 shown in FIG. 1. The communication device 202 may include a control device 204 operably coupled to a camera 206, a transceiver 210, and a user interface 222. The control device 204 may include at least a processor 226 and a memory device 228. The processor 226 may be configured to execute commands stored on the memory device 228. By way of non-limiting example, the memory device 228 may include a computer readable media, such as, read only memory (ROM), random access memory (RAM), flash memory, and combinations thereof. The control device may be configured to control the camera 206, and the user interface 222. In addition, the control device may be configured to cause the transceiver 210 to transmit and receive data through the networks 110.

The camera 206 may include devices capable of capturing and converting visual images to data, as will be readily apparent to those skilled in the art. By way of non-limiting example, the camera may include a webcam, a camcorder device, a camera device integrated into the same enclosure as the control device 204, and other suitable devices. The camera 206 may be operably coupled to the control device 204 and configured to deliver the data to the control device 204.

The user interface 222 may include an input device 224 and an output device 208 operably coupled to the control device 204. By way of non-limiting example, the input device 224 may include a keyboard, a numerical keypad, a mouse, a touch-screen, a button array, a track pad, a remote control, motion sensors, orientation sensors, position sensors, a microphone, and combinations thereof. The input device 224 may be configured to receive commands from the user. Also by way of non-limiting example, the output device 208 may include any of a light-emitting diode (LED) array, a segmented display, a liquid crystal display, a cathode ray tube display, a plasma display, and other electronic displays. The output device 208 may also include other peripheral output devices, such as speakers and vibrators. In some embodiments, the input device 224 and the output device 208 may be integrated in the same device, such as, for example, a touch-screen display. In other embodiments, the input device 224 and the output device 208 may be implemented in separate devices, such as a keyboard and an LCD monitor, respectively.

The control device 204 may cause the output device 208 to display video images received as data at the transceiver 210 during a video call. The control device 204 may also cause the output device 208 to display options on the output device 208, such as through a graphical user interface displayed on the output device 208. In addition, the control device 204 may execute user commands received by the input device 224.

The user interface 222 may enable the user of the communication device 202 to take several types of actions. Some of these actions may include logging in to the communication device 202 as a specific user, creating a new user group 120, inviting another communication device 202 to join a user group 120, withdrawing a communication device 202 from the user group 120, place a video call to another communication device 202, accept an incoming call from another communication device 202, access account information associated with the communication device 202, access account information associated with a user group 120 with which the communication device 202 is associated, etc.

Figure 3A:
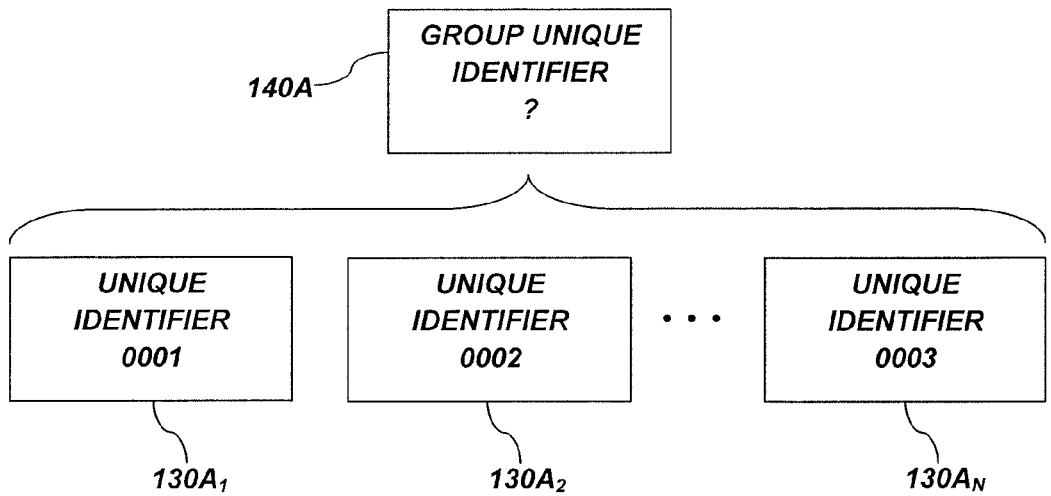
FIGS. 3A and 3B illustrate a method for assigning a group unique identifier to a user group according to an embodiment of the present disclosure.
Figure 3B:
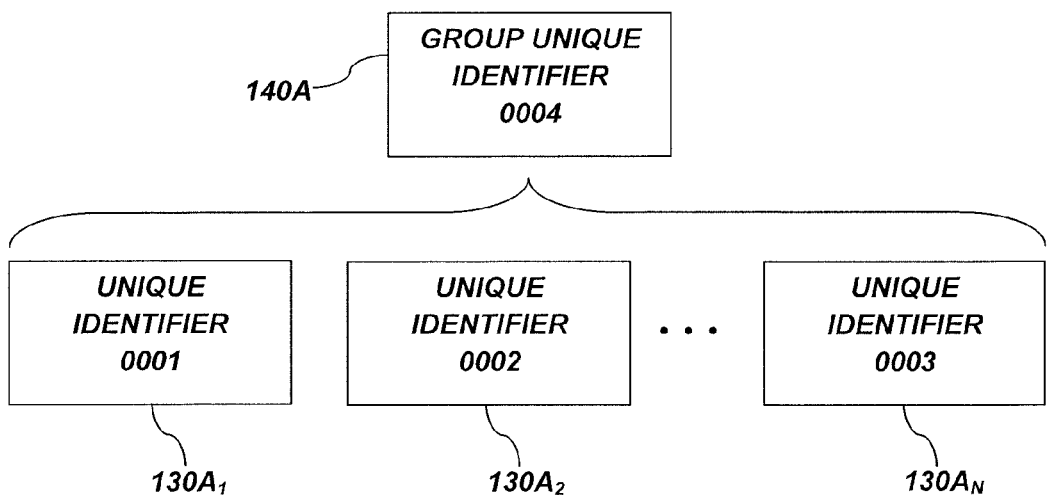

FIGS. 3A and 3B illustrate a method for assigning a group unique identifier 140 to a user group 120 according to an embodiment of the present disclosure. In particular, the first group 120A (FIG. 1) may receive a group unique identifier 140A to be associated with each of the communication devices 202 (FIG. 1) that are members of the first group 120A. As depicted in FIGS. 3A and 3B, the group unique identifier 140A may be a completely new identifier that was not previously an individual unique identifier $130A_1$, $130A_2$, $130A_N$ that is associated with one of the communication of the first user group 120A.

For example, the first user may decide to group together a plurality of communication devices 202, wherein each of the plurality of communication devices 202 have already been assigned their own individual unique identifiers 130. For example, the first communication device $202A_1$ is associated with the first individual unique identifier $130A_1$ of "0001," the second communication device $202A_2$ is associated with the second individual unique identifier $130A_2$ of "0002," and the Nth communication device $202A_N$ is associated with the Nth individual unique identifier $130A_N$ of "0003."

As depicted in FIG. 3A, when the first user group 120A is created, the group unique identifier 140A may be unassigned. As depicted in FIG. 3B, the first user group 120A may be assigned a new group unique identifier 140A that was not previously assigned to any communication device 202 of the newly formed user group 120A. In other words, when the first user group 120A is created, the first user group 120A may be initialized with a new individual unique identifier $130A_1$ assigned thereto. For example, the group unique identifier 140A assigned to the user group 120A is "0004." The four digit unique identifiers 130, 140 are illustrated as a simple example of a unique identifier. As discussed above, the unique identifiers 130, 140 may be a telephone number, IP address, or other suitable identifier.

Figure 4A:
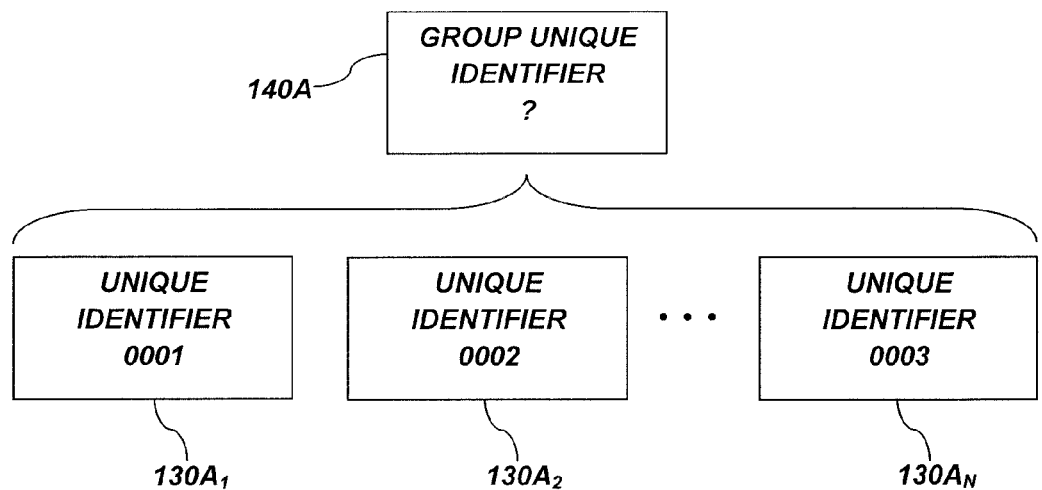
FIGS. 4A and 4B illustrate a method for assigning a group unique identifier to a user group according to another embodiment of the present disclosure.
Figure 4B:
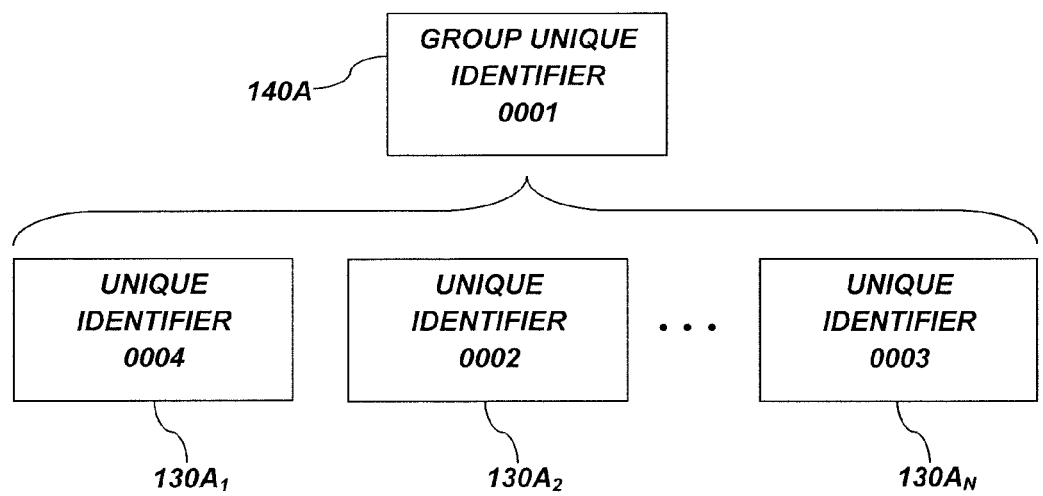

FIGS. 4A and 4B illustrate a method for assigning a group unique identifier 140 to a user group 120 according to another embodiment of the present disclosure. In particular, the first group 120A (FIG. 1) may receive a group unique identifier 140A to be associated with each of the communication devices 202 (FIG. 1) that are members of the first group 120A. As depicted in FIGS. 4A and 4B, the group unique identifier 140A may be a selected from an existing individual unique identifier 130A that was previously an individual unique identifier $130A_1$, $130A_2$, $130A_N$ that is associated with one of the communication of the first user group 120A.

For example, in some embodiments, the group unique identifier 140A assigned to the user group 120A may be selected from among the individual unique identifiers $130A_1$, $130A_2$, ... $130A_N$ that are part of the user group 120A. For example, the individual unique identifier $130A_1$ of the first communication device $202A_1$ may be "promoted" to be the group unique identifier 140A for the first user group 120A. As a result, the individual unique identifier $130A_1$ ("0001") previously associated with the first communication device $202A_1$ may be "sacrificed" and becomes the unique identifier 140A for the first user group 120A. In some embodiments, another individual unique identifier $130A_1$ ("0004") may be assigned to the first communication device $202A_1$ so that the first communication device $202A_1$ may remain associated with both the individual unique identifier $130A_1$ and the group unique identifier 140A associated with the first user group 120A.

When a user group 120 is established, the information (contacts, blocked calls, etc.) associated with the individual communication devices 202 may become group information (i.e., accessible through the other communication devices 202 of the user group 120), as desired by the user. In some embodiments involving a user group 120 initiated through promotion of an existing individual unique identifier 130 to become the group unique identifier 140 associated with the user group 120, only the information for that individual communication device 202 (e.g., communication device $202A_1$) may be promoted to be group information.

Even though the establishment of the user group 120A is described with reference to FIGS. 3A, 3B, 4A, and 4B in terms of assigning the group unique identifier 140A to a newly established user group 120A, similar methods may be used to change the group unique identifier 140 after the user group 120 has been established. Therefore, the group unique identifier 140 assigned to the user group 120 may be changed by assigning a completely new group unique identifier 140 to the user group 120. In addition, the group unique identifier 140 may be changed by promoting one of the individual unique identifiers 130 to be the new group unique identifier 140 assigned to the user group 120, which may cause that a new individual unique identifier 130 be assigned to the corresponding communication device 202. In addition, the group unique identifier 140 associated with the user group 120 may be "demoted." In other words, the group unique identifier 140 assigned to the user group 120 may once again become associated with a corresponding first communication device 202, and a new group unique identifier 140 may be assigned (e.g., new issuance, promotion, etc.) to the user group 120, or the user group 120 may be dissolved.

Figure 5A:
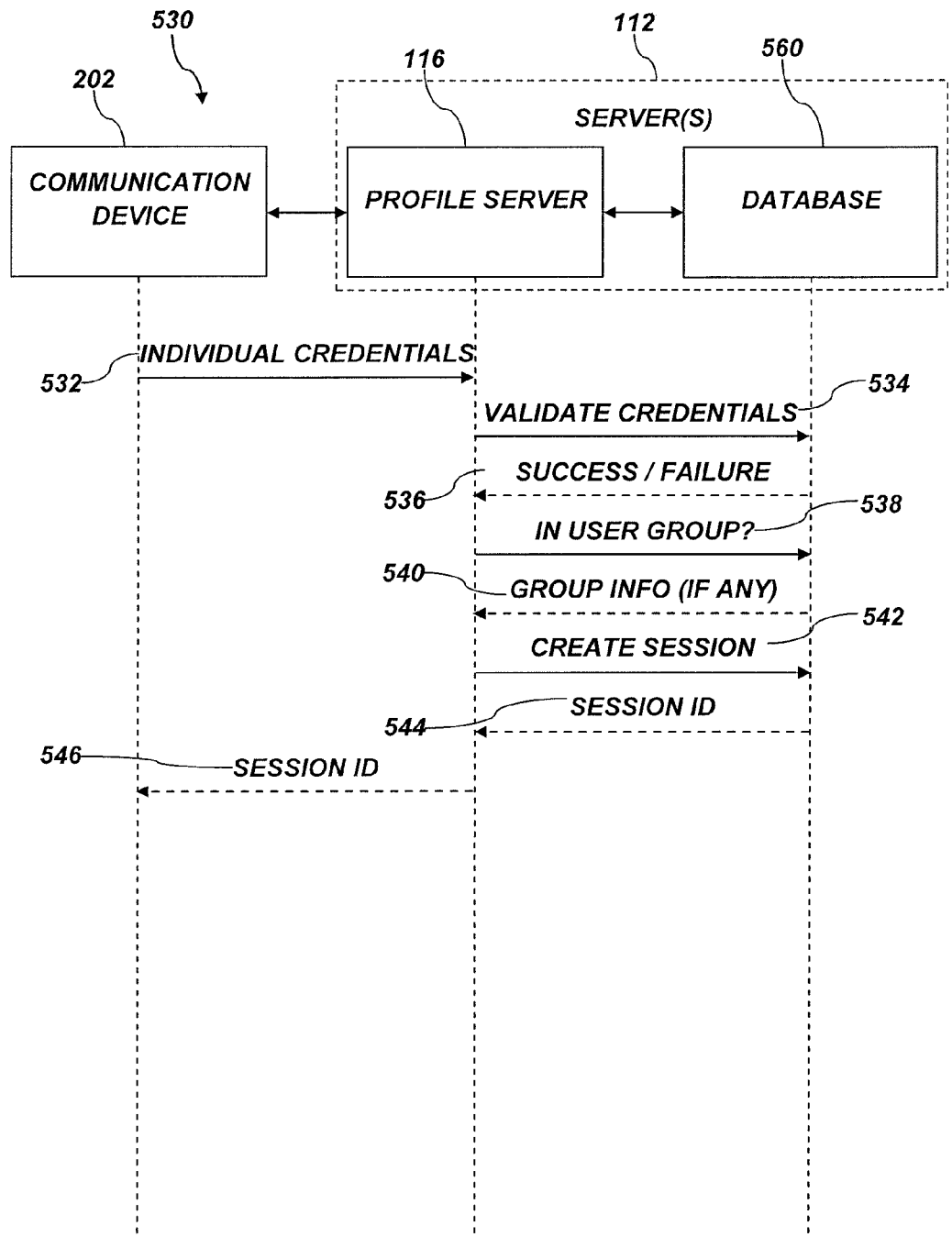
FIGS. 5A and 5B are data flow charts illustrating data flow between a communication device, a profile server, and a database associated with the profile server.
Figure 5B:
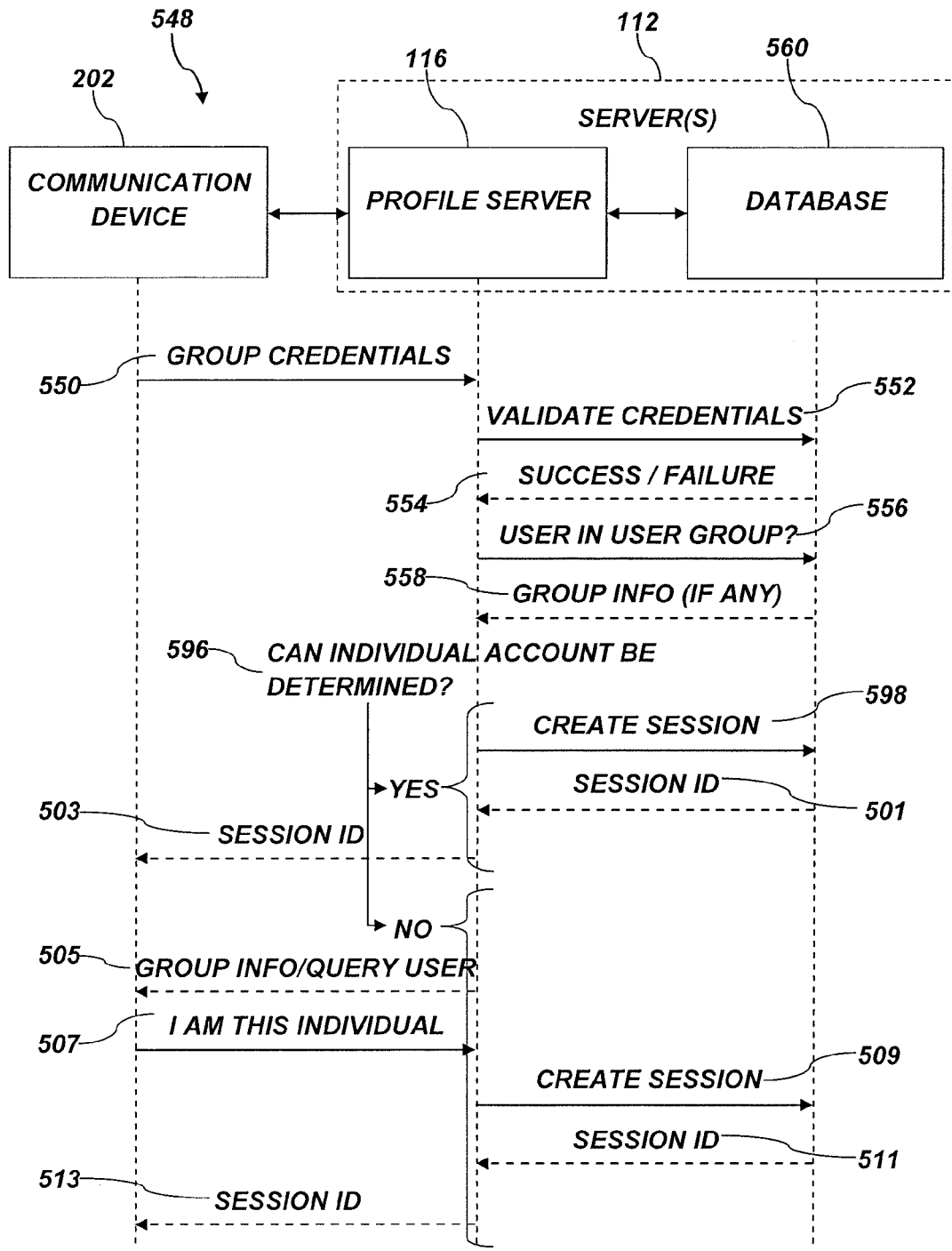

FIGS. 5A and 5B are data flow charts 530, 548 illustrating data flow between a communication device 202, a profile server 116, and a database 560 associated with the profile server 116. FIG. 5A illustrates data flow resulting from communication device 202 logging in with individual credentials associated with the communication device to access account information. FIG. 5B illustrates data flow resulting from the communication device 202 logging in with group credentials associated with a user group 120 to access account information, the communication device 202 belonging to the user group 120.

The database 560 may be configured to store individual account information corresponding to the communication device 202 and group account information corresponding to a user group 120 (FIG. 1) to which the communication device 202 belongs. Individual account information may include valid individual log in credentials (also referred to herein as "individual credentials"), user information, and individual communication device 202 information associated with the communication device 202. Group account information may include valid group log in credentials (also referred to herein as "group credentials"), user information, and group information associated with the user group. The group account information may also include information corresponding to a plurality of communication devices 202 that belong to the user group 120.

Referring to FIG. 5A, the user of the communication device 202 may provide individual credentials through the user interface 222 (FIG. 2) of the communication device 202. By way of non-limiting example, the individual credentials may be a user name and password. In some embodiments, the user name may be the individual unique identifier 130 assigned to the communication device 202. Other individual credentials, such as for example a user selected user name, are also contemplated.

At operation 532, the communication device 202 may send the individual credentials through the networks 110 (FIG. 1) to the profile server 116. At operation 534, the profile server 116 may send a validation request to the database 560 to validate the individual credentials provided by the user against the valid individual credentials stored in the database 560.

At operation 536, the database 560 may send a success/failure signal to the profile server 116 indicating either success or failure of the log in attempted by the user of the communication device 202. If the individual credentials provided by the user of the communication device 202 do not match those stored in the database 560, then the success/failure signal sent to the profile server 116 may indicate failure of the log in attempt. As a result, the user may not be given access to account information. If, on the other hand, the log in credentials provided by the user of the communication device 202 match those stored on the database 560, the success/failure signal sent to the profile server 116 may indicate a successful log in attempt. As a result, the user may be given access to the individual account information.

In some embodiments, the profile server 116 may also cause the communication device to give the user access to the group account information along with the individual account information if the communication device 202 belongs to the user group 120. If, however, the communication device 202 is not associated with the user group 120, then the profile server 116 may cause the communication device 202 to only access the individual account information. In other embodiments, logging in with the individual credentials may exclude the communication device 202 from accessing the group account information regardless of whether the communication device 202 belongs to the user group.

If the log in attempt succeeds, at operation 538 the profile server 116 may query the database 560 to determine whether the communication device 202 belongs to a user group 120. At operation 540, the database 560 may send the group account information to the profile server 116 if the communication device 202 is part of the user group 120. If, on the other hand, the communication device 202 is not part of the user group 120, the database 560 may only send the individual account information, and not the group account information.

The profile server 116 may create a session and cause a session identifier to be stored on the database 560 at operation 542. At operation 544, the database may send the session identifier to the profile server 116. At operation 546, the profile server 116 may send the session identifier through the networks 110 to the communication device 202, and the user may operate the communication device 202 as both the communication device 202 and the user group 120 if the communication device 202 belongs to the user group 120, and only as the communication device 202 if the communication device 202 does not belong to the user group 120.

Referring to FIG. 5B, the user of the communication device 202 may provide group credentials through the user interface 222 (FIG. 2) of the communication device 202. The group credentials may include a user name and password. In some embodiments, the user name may be the group unique identifier 140 assigned to the communication device 202. Other group credentials, such as for example a user selected username, are also contemplated.

At operation 550, the communication device 202 may send the group credentials through the networks 110 (FIG. 1) to the profile server 116. At operation 552, the profile server 116 may send a validation request to the database 560 to validate the group credentials provided by the user against the valid group credentials stored in the database 560.

At operation 554, the database 560 may send a success/failure signal to the profile server 116 indicating either success or failure of the log in attempted by the user of the communication device 202. If the group credentials provided by the user of the communication device 202 do not match those stored in the database 560, then the success/failure signal sent to the profile server 116 may indicate failure of the log in attempt. As a result, the user may not be given access to account information. If, on the other hand, the group credentials provided by the user of the communication device 202 match those stored on the database 560, the success/failure signal sent to the profile server 116 may indicate a successful log in attempt. As a result, the user may be given access to the group account information.

If the log in attempt succeeds, at operation 556 the profile server 116 may query the database 560 to determine whether the communication device 202 belongs to a user group 120. At operation 558, the database 560 may send the group account information to the profile server 116 if the communication device 202 is part of the user group 120. If, on the other hand, the communication device 202 is not part of the user group 120, the database 560 may not send the group account information.

Once the user succeeds in logging in with group credentials, at operation 596 the profile server 116 may attempt to determine which individual account information to give the communication device 202 access to along with the group account information. If the profile server 116 succeeds in determining which individual account information to provide, the profile server 116 may create a session and cause a session identifier to be stored on the database 560 at operation 598. At operation 501, the database may send the session identifier to the profile server 116. At operation 503, the profile server 116 may send the session identifier through the networks 110 to the communication device 202, and the user may operate the communication device 202 as both the communication device 202 and the user group 120.

Returning to operation 596, if the profile server cannot determine which individual account information to provide to the user, at operation 505 the profile server may send the group account information to the communication device 202 and query the user to indicate which individual account information to provide. At operation 507, the user may indicate the individual account information that should be provided, and the indication may be sent to the profile server 116. At operation 509, the profile server may create a session, and cause a session identifier to be stored in the database 560. The database 560 may send the session identifier to the profile server 116 at operation 511, and the profile server 116 may send the session identifier through the networks 110 to the communication device 202 at operation 513. The user may then operate the communication device 202 as both the communication device 202 and the user group 120. As a result, using a group unique identifier 140 to log in may also cause the communication device 202 to communicate with the one or more servers 112 responsive to being addressed by the individual unique identifier 130 assigned to the communication device.

Figure 6A:
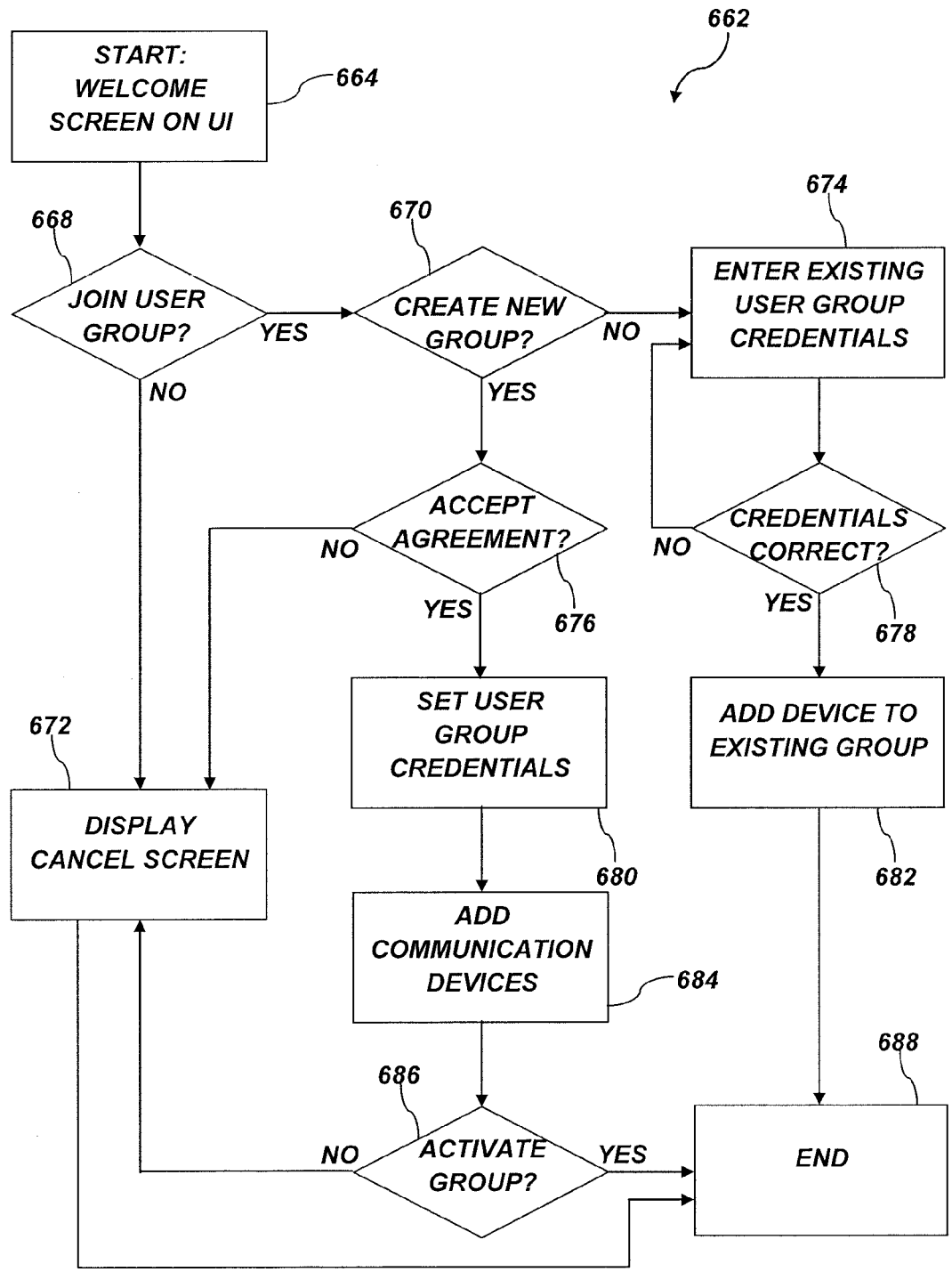
FIGS. 6A through 6I illustrate a method for using a user interface of a communication device to add the communication device to a new or existing user group.

FIGS. 6A through 6I illustrate a method for using a user interface 622 of a communication device 202 (FIG. 2) to add the communication device 202 to a new or existing user group 120 (FIG. 1). FIG. 6A is a flowchart 662 illustrating the method for using the user interface 622 to add the communication device 202 to the user group 120. FIGS. 6B through 6I are simplified plan views of a portion of a user interface 622 of the communication device 202 (FIG. 2) including a screen display 698, at some of the operations of the flow chart 662 of FIG. 6A. The user interface 622 may be configured to enable a user to create and administer a new user group. It should be noted that FIGS. 6B through 6I correspond to embodiments including a user interface 622 with a display screen 698. The present disclosure, however, is not so limited. As previously discussed with respect to the user interface 222 of FIG. 2, the user interface 622 may include an output device, which may take a variety of forms. For example, the output device may be a screen display including any of a light-emitting diode (LED) array, a segmented display, a liquid crystal display, a cathode ray tube display, a plasma display, and other electronic displays. The output device 208 may also include other peripheral output devices, such as speakers and vibrators. In some embodiments, the output device may be integrated with an input device as the same device, such as, for example, a touch-screen display. In other embodiments, the output device and the input device may be implemented as separate devices, such as an LCD monitor and keyboard, respectively. As the output device of the user interface 622 may take a variety of forms, the screen display 698 of FIGS. 6B through 6I is merely a non-limiting example of some of a variety of possible embodiments.

It should also be noted that in some embodiments, the user interface 622 may include a software application configured to be executed by a processor 226 (FIG. 2) of the communication device 202. In other embodiments, the software application may be executed by the one or more servers 112 (FIG. 1). In still other embodiments, parts of the software application may be executed by the communication device 202, and other parts of the software application may be executed by the one or more servers 112.

Figure 6B:
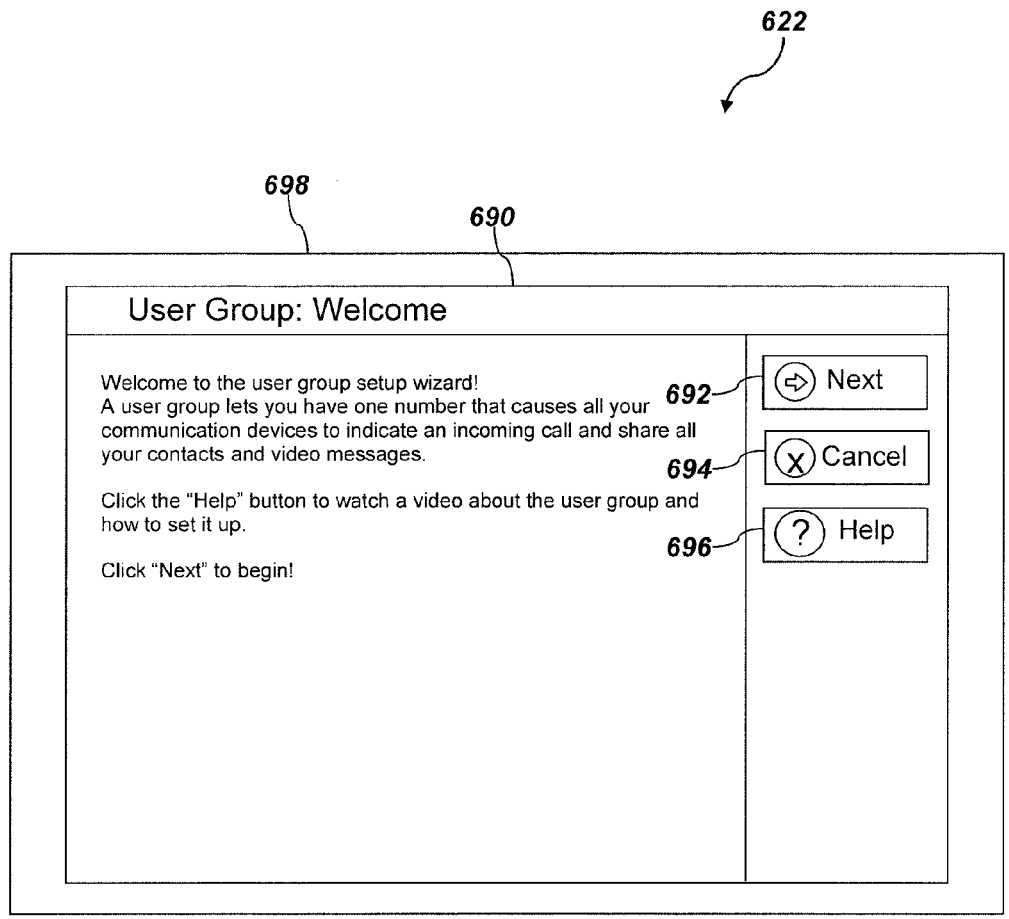

Referring to FIGS. 6A and 6B, at operation 664, the user interface 622 may present a welcome message 690 to a user of the communication device 202. In some embodiments, presenting the welcome message 690 may comprise displaying a welcome screen, such as, for example, the welcome screen illustrated in FIG. 6B. The user interface 622 may present a join user group option 692 and a cancel option 694 with the welcome message 690. By way of non-limiting example, the join user group option 692 may be a "next" option. Also by way of non-limiting example, the welcome message 690 may present a "help" option 696 configured to provide helpful instructions and/or guidance regarding joining a user group 120 if the user selects the help option 696. The user interface 622 may optionally be configured to display a video providing instructions and/or guidance regarding joining a user group 120 responsive to the user selecting the help option 696.

At operation 668, the user may select one of the join user group option 692 and the cancel option 694. The term "select," and other derivations of the root word "select," such as "selecting," "selected," "selection," etc., may refer to selecting an option presented by the user interface 622. As previously discussed with respect to the user interface 222 of FIG. 2, the user interface 622 may include an input device, which can take various forms. By way of non-limiting example, the input device may include a keyboard, a numerical keypad, a mouse, a touch-screen, a button array, a track pad, a remote control, motion sensors, orientation sensors, position sensors, a microphone, and combinations thereof. As the input device of the user interface 622 may take any of a variety of forms, "select" may embody any of a variety of actions including, but not limited to, clicking on an option presented on a screen with a mouse, touching an option presented on a touch-screen interface, pressing a button on a button array that corresponds to an option being presented by the user interface, speaking an option into a microphone, and etc. At operation 668, if the user selects the cancel option 694, the user interface 622 may display a cancel message 601 (FIG. 6C) at operation 672.

Figure 6C:
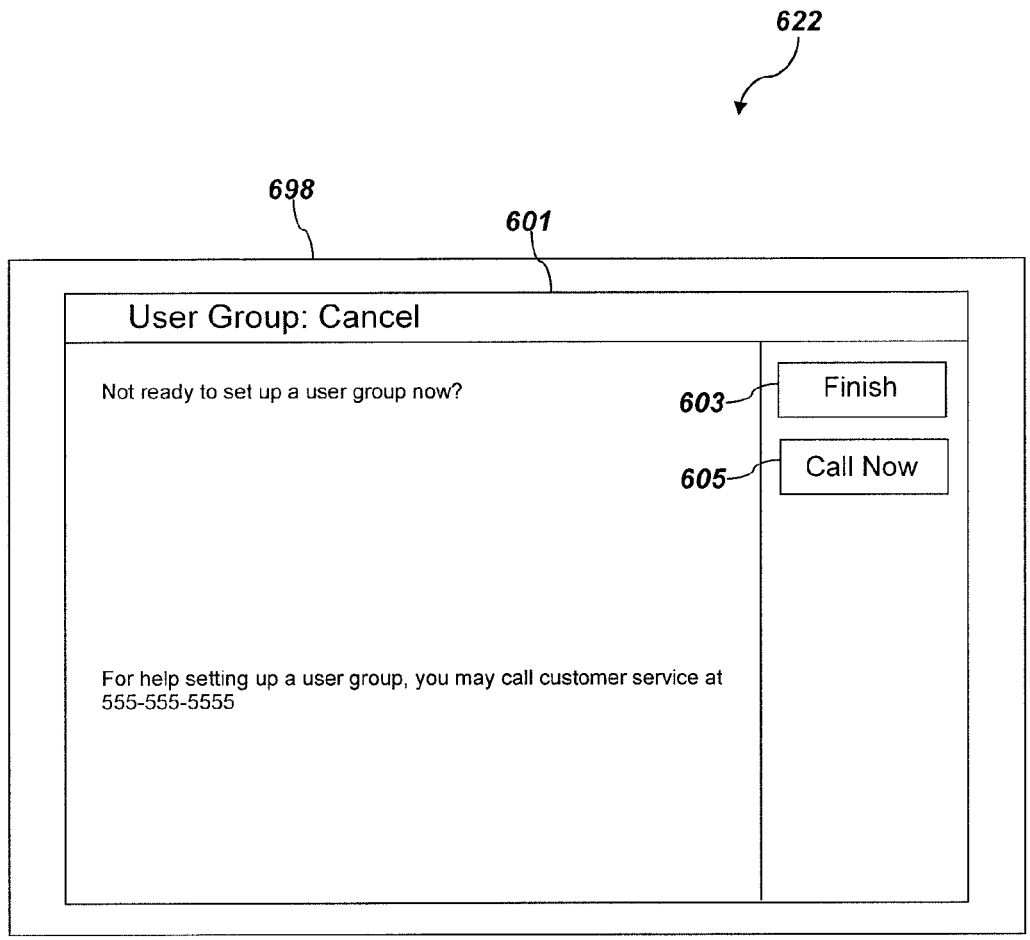

Referring to FIGS. 6A and 6C, by way of non-limiting example, the cancel message 601 may include a finish option 603 configured to cause the method to end at operation 688 if the user selects the finish option 603. Also by way of non-limiting example, the cancel message 601 may include a "call now" option 605 configured to cause the method to end at operation 688, and to cause the communication device 202 to call a customer service representative if the user selects the call now option 605.

Figure 6D:
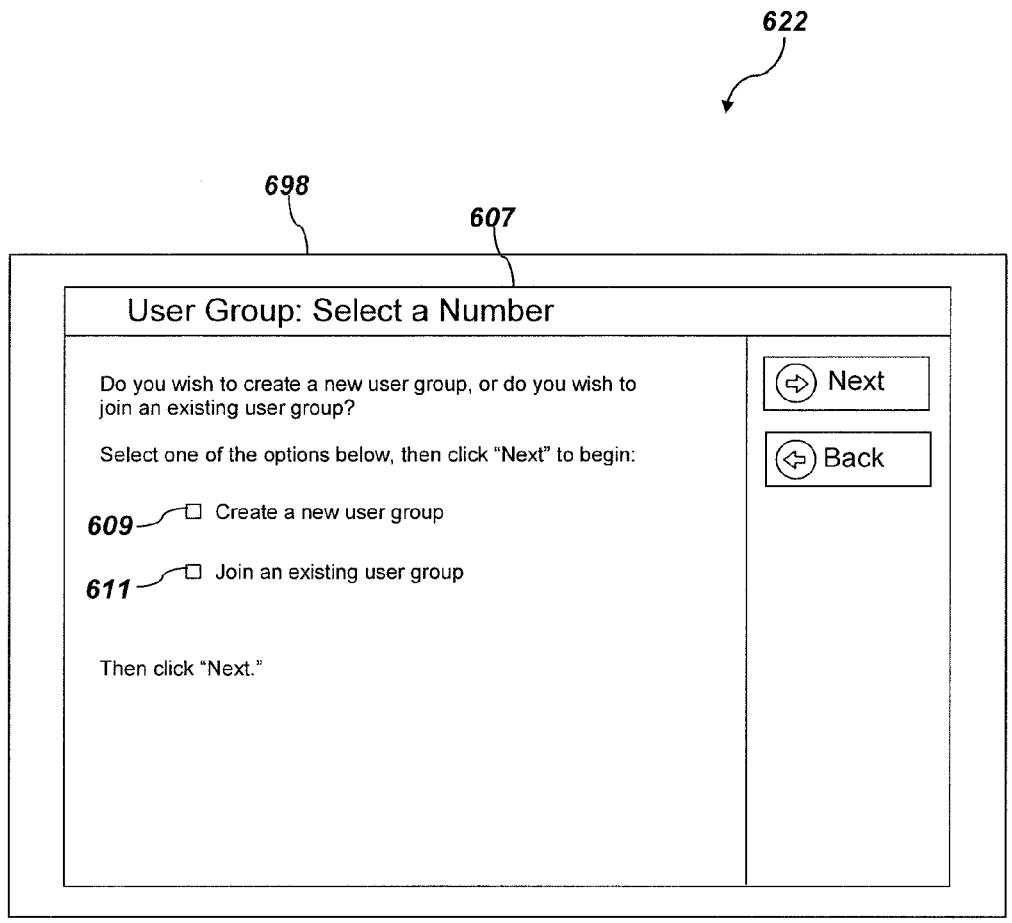

Referring again to FIGS. 6A and 6B, and going back to operation 668, if the user selects the join user group option 692, the user interface 622 may present a select a number message 607 (FIG. 6D) at operation 670. Referring to FIGS. 6A and 6D, the select a number message 607 may include a new group option 609 and an existing group option 611. If the user selects the new group option 609, the user interface 622 may present an agreement message 613 (FIG. 6E) delineating any terms required for creating the user group 120 at operation 676.

Figure 6E:
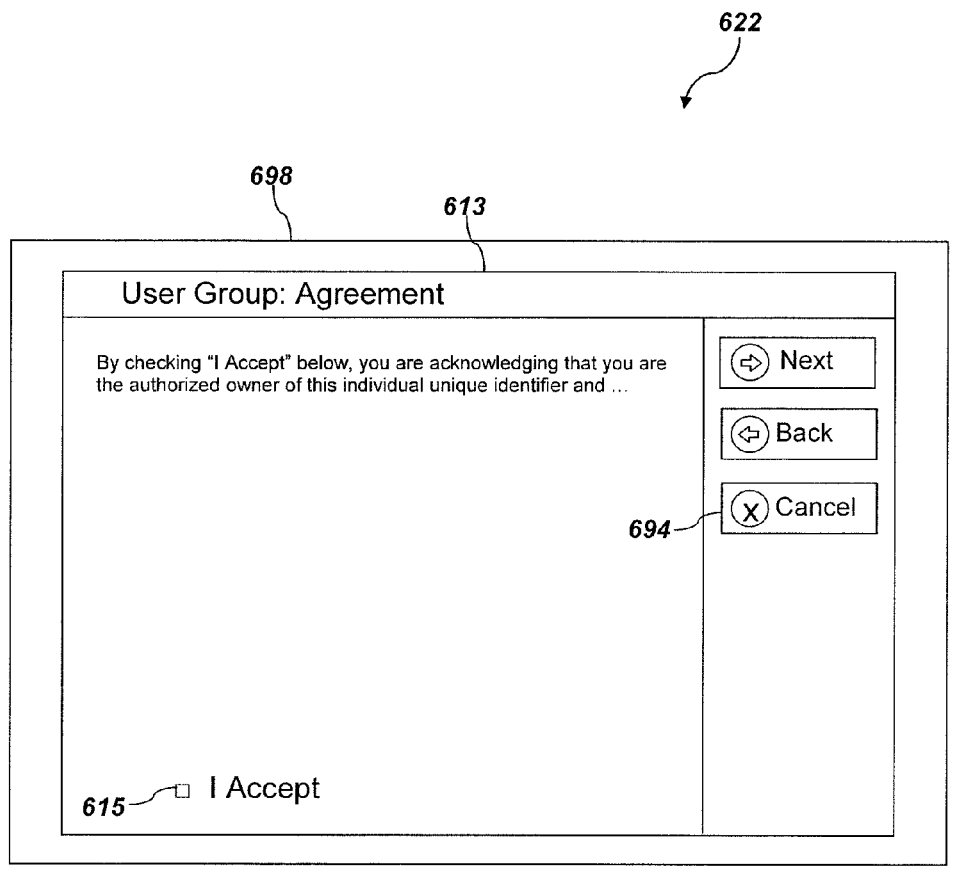

Referring to FIGS. 6A and 6E, the agreement message 613 may include an accept agreement option 615 and the cancel option 694. If the user selects the cancel option 694, then the user interface 622 may present the cancel message 698 (FIG. 6C) at operation 672, and the method may end at operation 688. If, on the other hand, the user selects the accept agreement option 615 at operation 676, the user interface 622 may present a set group credentials message 617 (FIG. 6F) at operation 680.

Figure 6F:
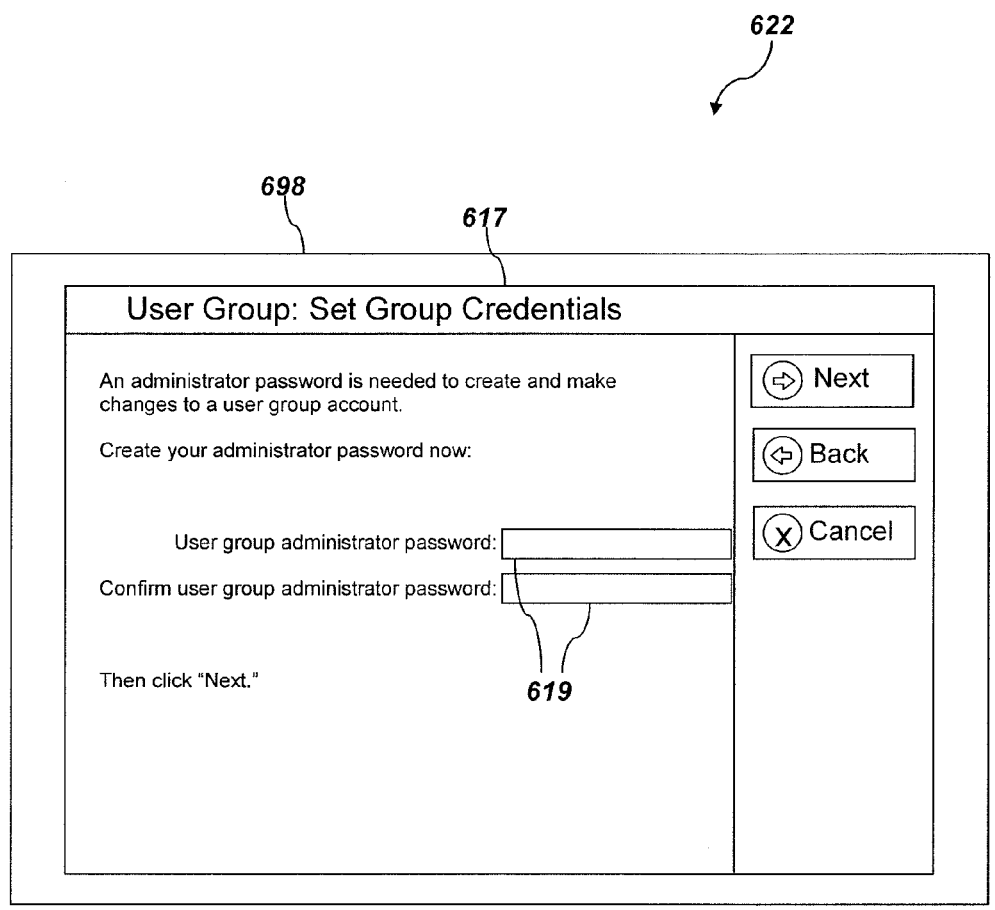

Referring to FIGS. 6A and 6F, the set group credentials message 617 may include a prompt 619 to set group credentials. By way of non-limiting example, the prompt 619 to set group credentials may include a text input configured for a user to input a user group administrator password, and confirm the user group administrator password. Once the user has provided the group credentials, the user interface 622 may present an add communication devices message 621 (FIG. 6G) at operation 684.

Figure 6G:
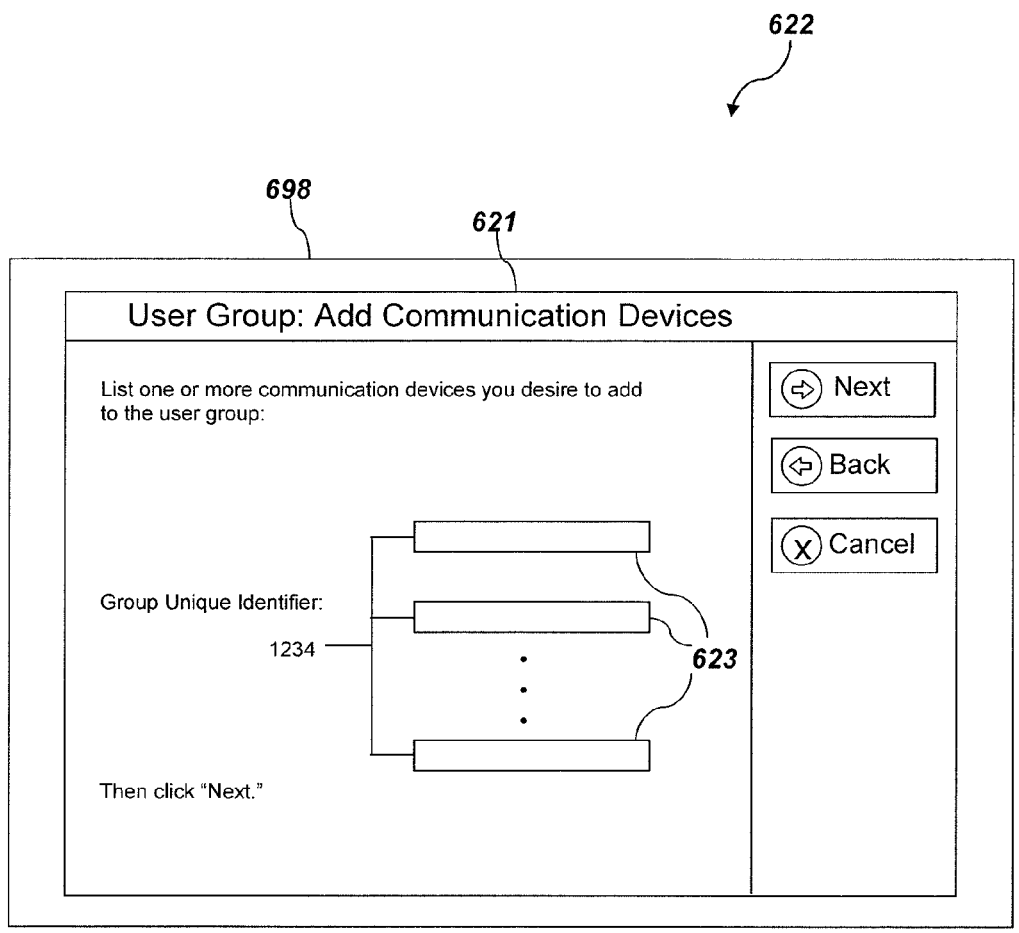

Referring to FIGS. 6A and 6G, the add communication devices message 621 may include a prompt 623 for adding other communication devices 202. The user may provide information to the user interface 622 that enables the user interface to identify one or more communication devices 202 that the user desires to add to the user group 120. By way of non-limiting example, the prompt 623 for adding other communication devices may include one or more text inputs configured to accept one or more individual unique identifiers 130 (FIG. 1) corresponding to the one or more communication devices 202 that the user desires to add to the user group 120. Also by way of non-limiting example, the prompt 623 for other adding communication devices may be configured to prompt the user to provide a description of each of the one or more communication devices 202, such as, for example a description of the location of the one or more communication devices 202, a name of a primary user of the one or more communication devices 202, a physical description of the one or more communication devices 202, other descriptions, and combinations thereof. Once the user interface 622 receives the information that enables the user interface 622 to identify the one or more communication devices 202 that the user desires to add to the user group 120, the user interface 622 may present a confirm activation message 625 (FIG. 6H) at operation 686.

Figure 6H:
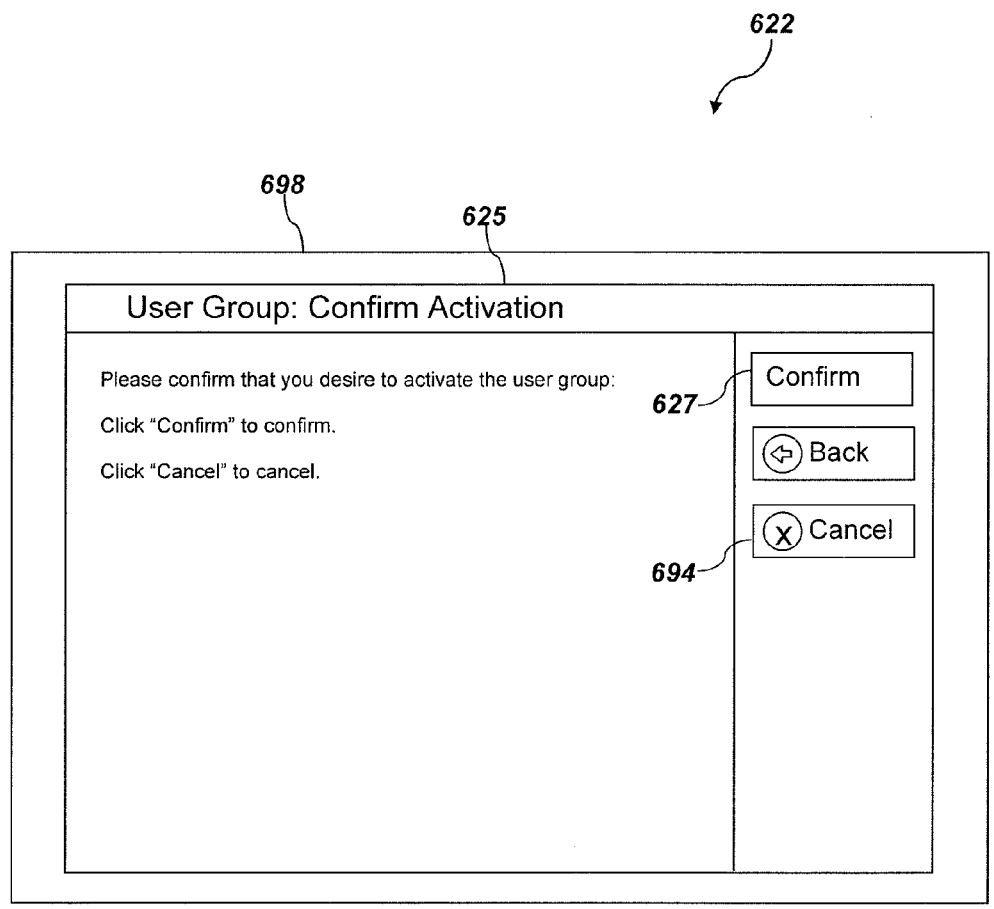

Referring to FIGS. 6A and 6H, the activation confirmation message 625 may include a confirm option 627 and the cancel option 694. If the user selects the confirm option 627, the user interface 622 may cause the user group 120 to be activated. By way of non-limiting example, a group unique identifier 140 may be assigned to the user group 120. In some embodiments, the group unique identifier may be a promoted individual unique identifier 130 of the communication device 202 used to create the user group 120, and a new individual unique identifier 120 may be assigned to the communication device 202 that created the user group 120, as discussed with respect to FIG. 1. In other embodiments, the group unique identifier may be a new group unique identifier 140, and the communication device 202 used to create the user group 120 may retain its individual unique identifier 130. In still other embodiments, another communication device 202 may have its individual unique identifier promoted 130 to the group unique identifier 140, and the another communication device 202 may receive a new individual unique identifier 130. Also by way of non-limiting example, the user interface may cause an invitation to be sent to each of the one or more communication devices 202 that the user identified at operation 684. Once the user group 120 is activated, the method may end at operation 688. If, on the other hand, the user selects the cancel option 694 at operation 686, the user interface 622 may present the cancel message 698 (FIG. 6C) at operation 672, and the method may end at operation 688.

Figure 6I:
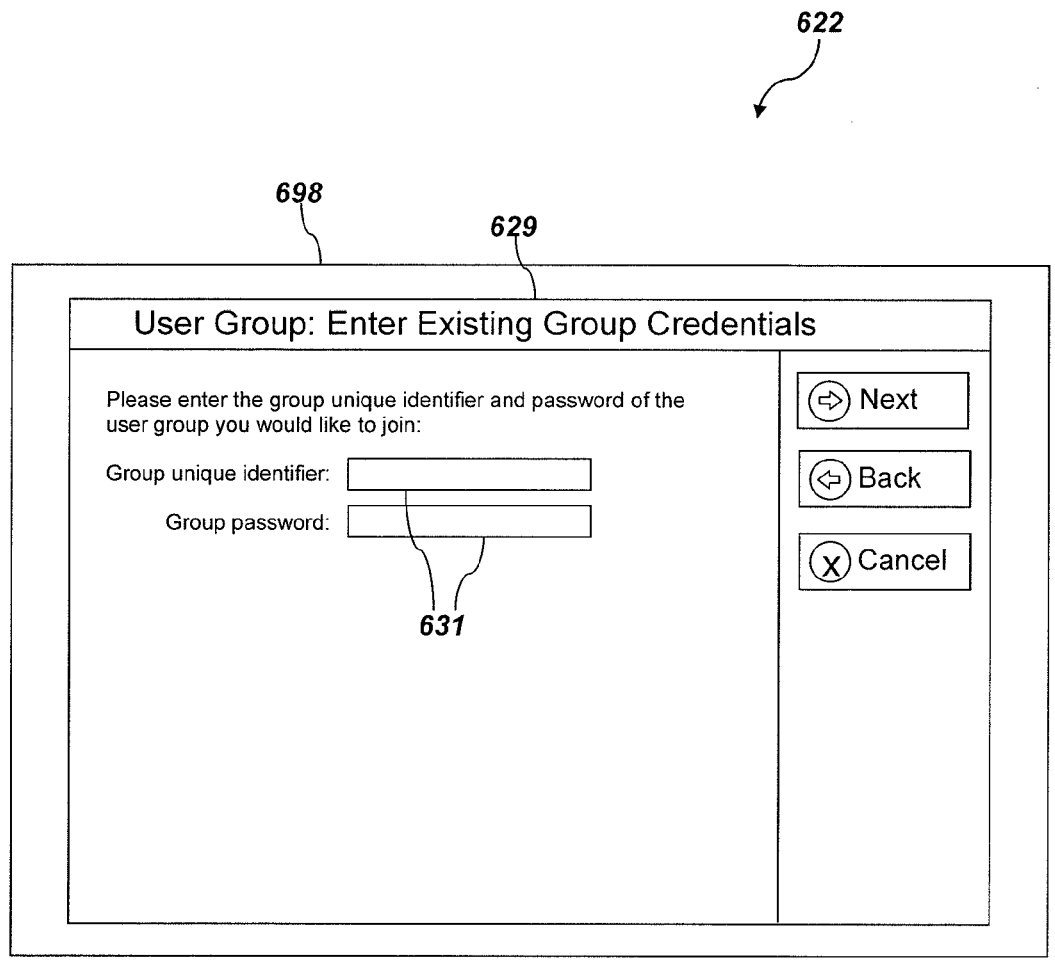

Returning again to operation 670, if the user selects the existing group option 611 (FIG. 6D), the user interface 622 may present an enter existing group credentials message 629 (FIG. 6I) at operation 674. Referring to FIGS. 6A and 6I, the enter existing group credentials message 629 may include a prompt 631 for group credentials corresponding to the existing user group 120. By way of non-limiting example, the prompt 631 for group credentials may include a text input configured to accept a group unique identifier 140 and a group password corresponding to the existing user group 120.

At operation 678 the user interface 622 may cause the group credentials provided by the user to be verified against a valid set of group credentials. By way of non-limiting example, the user interface 622 may cause the group credentials provided by the user to be verified against a valid set of group credentials stored on the communication device 202 being accessed by the user, by the one or more servers 112 (FIG. 1), by another communication device 202, or other device. If the group credentials provided by the user do not match the valid set of group credentials, the user interface 622 may once again present the enter existing group credentials message 629 at operation 674. If, on the other hand, the group credentials provided by the user match the valid set of group credentials, the user interface may cause the communication device 202 to be added to the existing user group 120 at operation 682. The method may then end at operation 688.

Figure 7A:
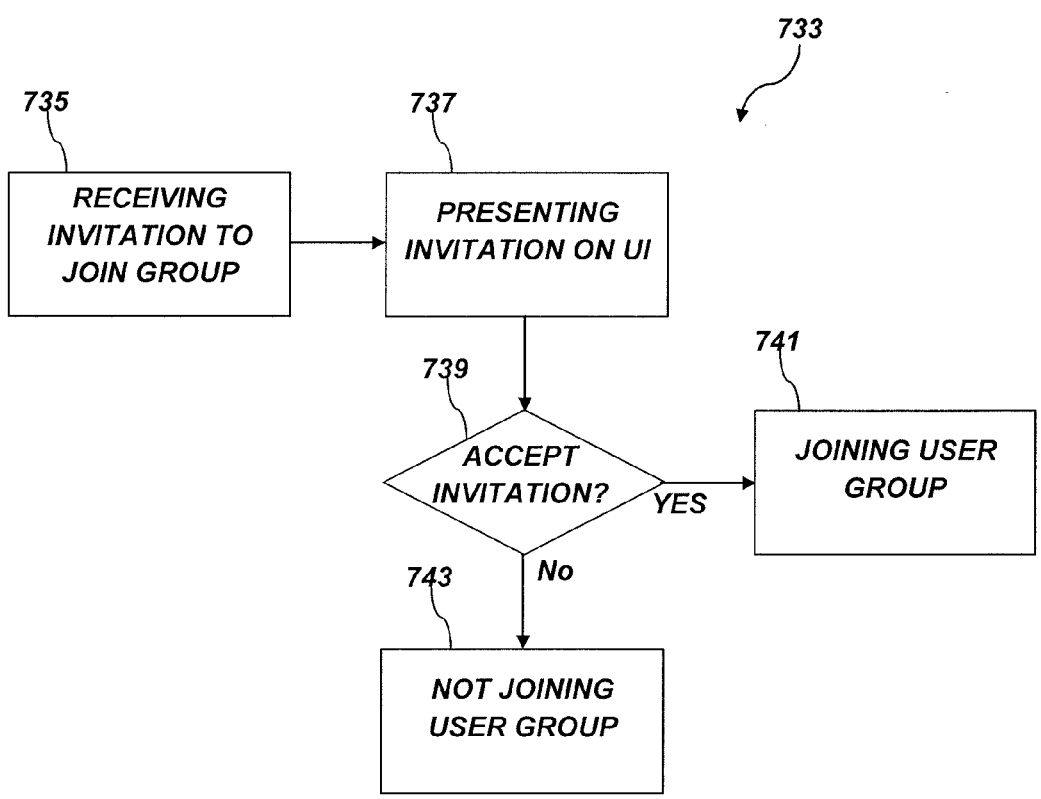
FIGS. 7A and 7B illustrate a method of using a user interface of a communication device to accept or reject an invitation to join a user group.
Figure 7B:
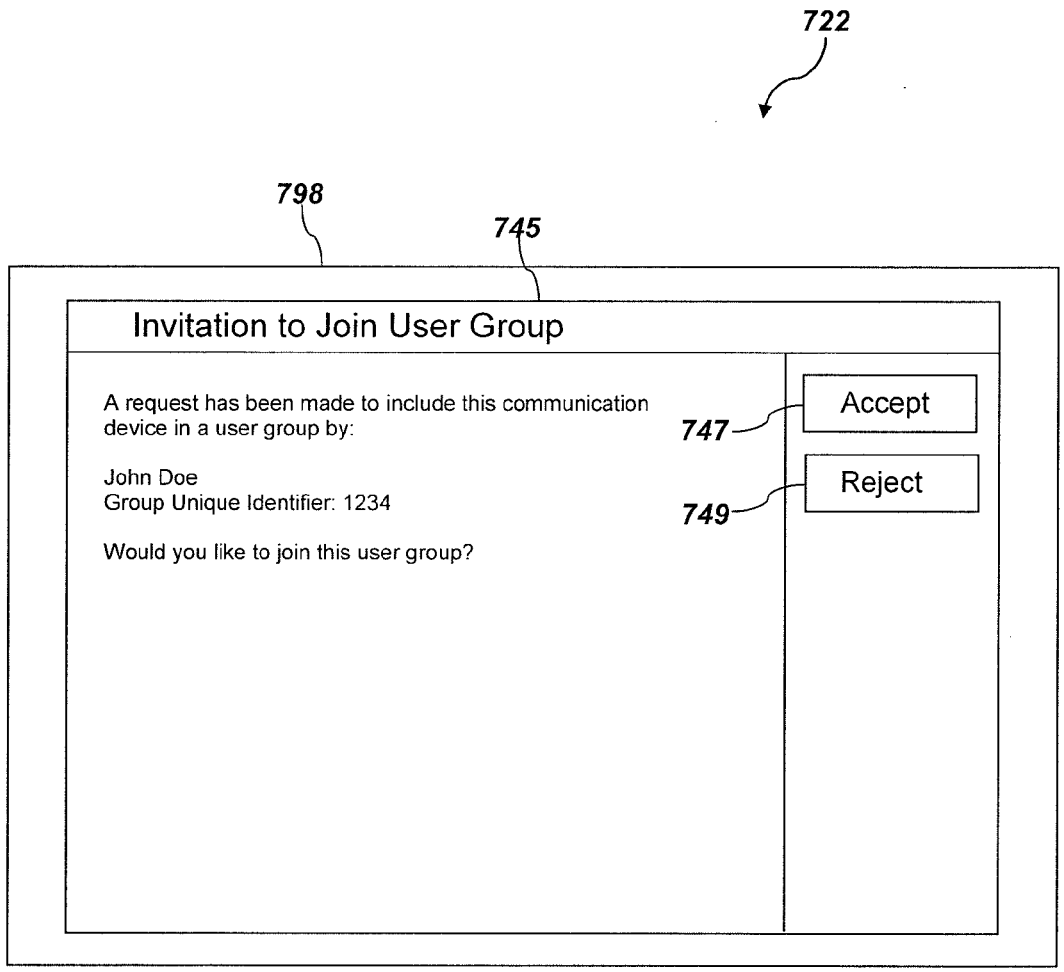

FIGS. 7A and 7B illustrate a method of using a user interface 722 of a communication device 202 (FIG. 2) to accept or reject an invitation to join a user group 120 (FIG. 1). The user interface 722 may be similar to the user interface of FIG. 622, and in some embodiments may include a screen display 798. FIG. 7A illustrates a flowchart 733 of the method. FIG. 7B is a simplified plan view of a portion of a user interface 722 of the communication device 202 including the screen display 798 at some of the operations of the flow chart 733 of FIG. 7A. Referring to FIG. 7A, at operation 735, the communication device 202 may receive an invitation to join a user group 120. The invitation to join the user group may be a response to another communication device 202 creating a new user group, as discussed with respect to FIGS. 6A through 6I.

At operation 737, the user interface 722 may present an invitation message 745 (FIG. 7B). Referring to FIGS. 7A and 7B, the invitation message 745 may indicate that the communication device received the invitation to join the user group 120. The invitation message 745 may include an accept invitation option 747 and a reject invitation option 749. At operation 739, the user may select one of the accept invitation option 747 and the reject invitation option 749. If the user selects the accept invitation option 747, the communication device 202 may join the user group at operation 741. If, on the other hand, the user accepts the reject invitation option 749 at operation 739, the communication device 202 may not join the user group 120 at operation 743.

FIGS. 8A through 8E illustrate a method of using a user interface 822 of a communication device 202 (FIG. 2) to change one or more group settings associated with a user group 120 (FIG. 1). In some embodiments, changing the group user settings may be restricted to a communication device 202 that created the user group 120. In other embodiments one or more other communication devices 202 may also change the group user settings.

Figure 8A:
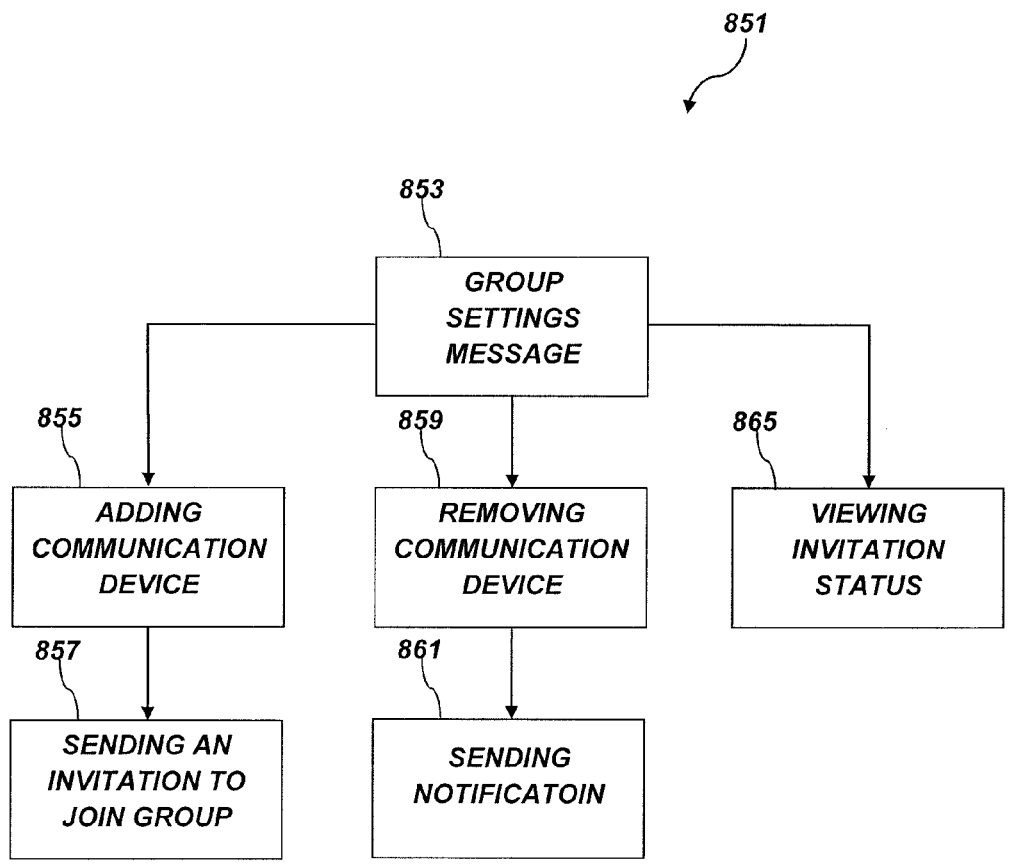
FIGS. 8A through 8E illustrate a method of using a user interface of a communication device to change one or more group settings associated with a user group.
Figure 8B:
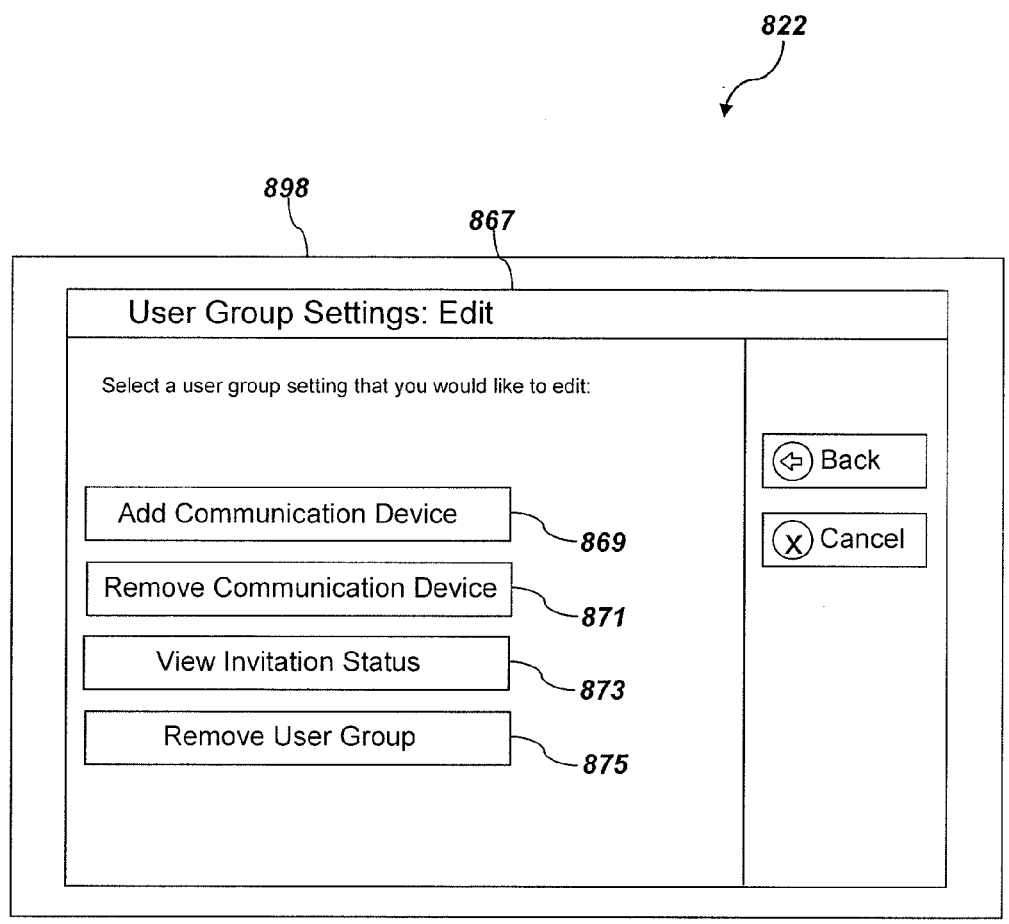

FIG. 8A is a flowchart 851 illustrating the method of using the user interface 822 to change the one or more group settings. FIGS. 8B through 8E are simplified plan views of a portion of a user interface 822 of the communication device 202 including a screen display 898, at some of the operations of the flow chart 851 of FIG. 8A. Referring to FIG. 8A, at operation 853, the user interface 822 may present a group settings message 869 (FIG. 8B). Referring to FIGS. 8A and 8B, the group settings message 869 may include an add communication device option 869, a remove communication device option 871, a view invitation status option 873, and a remove user group option 875. If the user selects the add communication device option 869, the user interface 822 may present an add communication device message 877 (FIG. 8C) at operation 855.

Figure 8C:
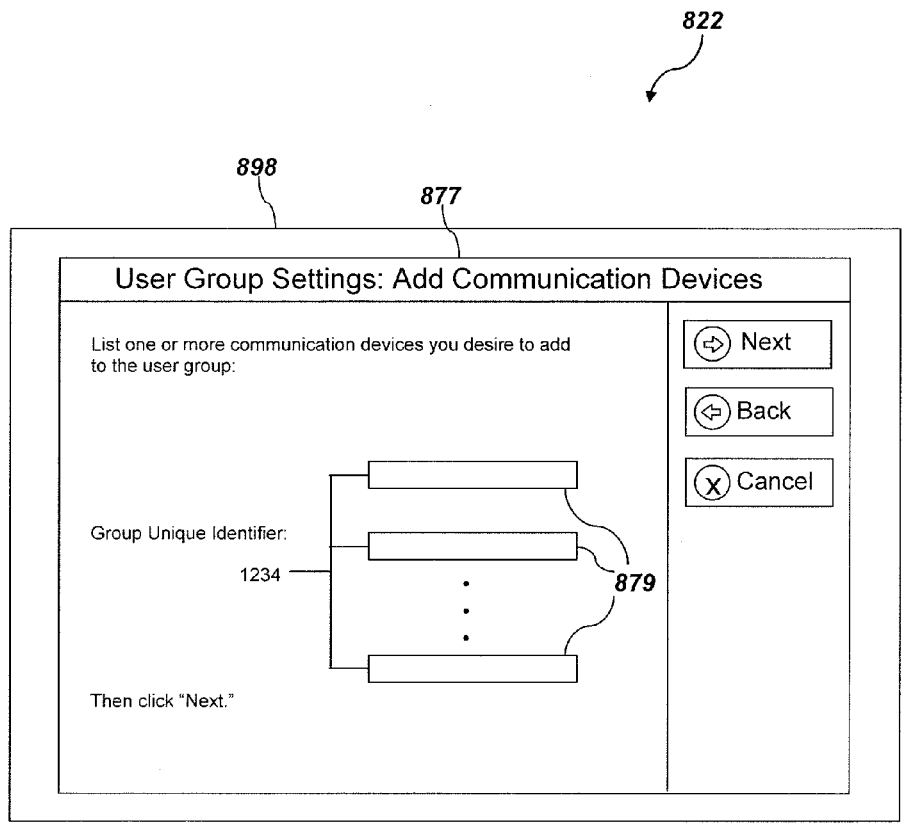

Referring to FIGS. 8A and 8C, the add communication device message 877 may include a prompt 879 for adding other communication devices 202 to the user group 120. The user may provide information to the user interface 822 that enables the user interface 822 to identify one or more communication devices 202 that the user desires to add to the user group 120. By way of non-limiting example, the prompt 879 for adding other communication devices may include one or more text inputs configured to accept one or more individual unique identifiers 130 (FIG. 1) corresponding to the one or more communication devices 202 that the user desires to add to the user group 120. Responsive to the user providing the information that enables the user interface 822 to identify the one or more communication devices 202 that the user desires to add to the user group 120, the user interface may send an invitation to the one or more communication devices 202 to join the user group 120 at operation 857.

Figure 8D:
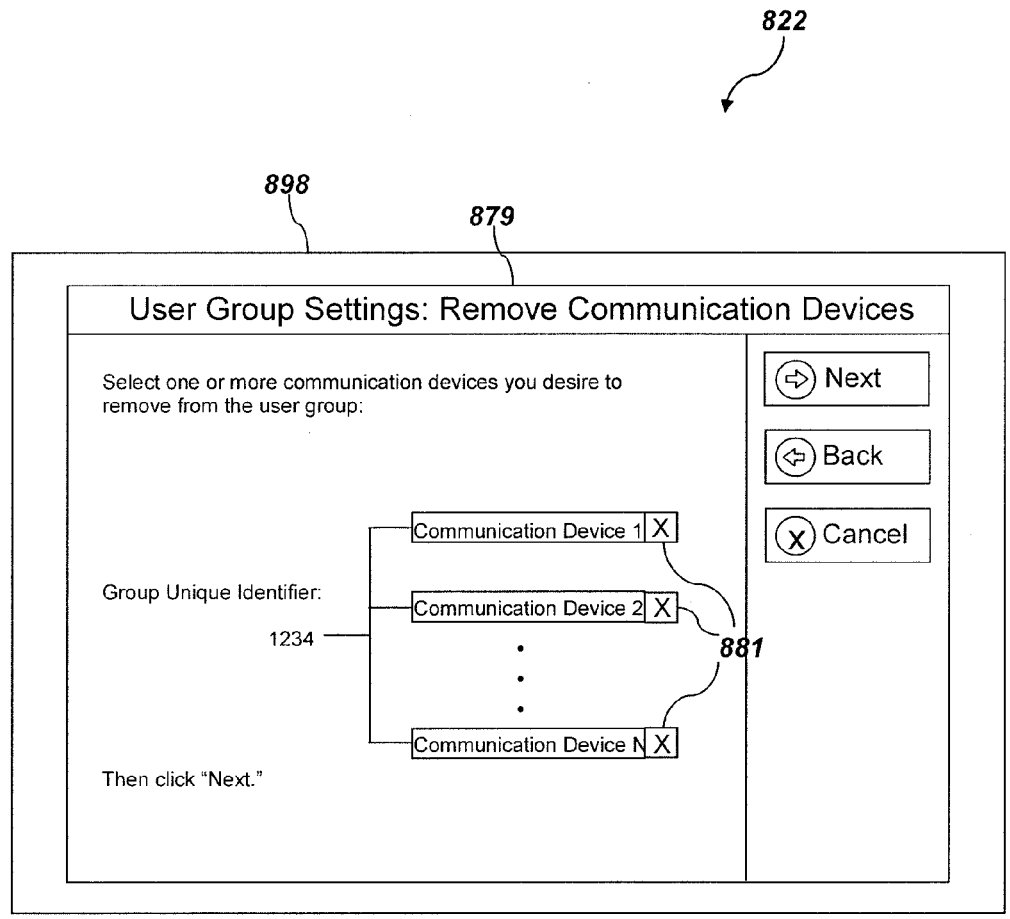

Referring again to FIGS. 8A and 8B, and returning to operation 853, if the user selects the remove communication device option 871, the user interface 822 may present a remove communication device message 879 (FIG. 8D) at operation 859. Referring now to FIGS. 8A and 8D, the remove communication device message 879 may include one or more remove communication device options 881, each remove communication device option 881 corresponding to a communication device 202 in the user group. The user interface 822 may cause the communication device 202 corresponding to a selected remove communication device option 881 to be removed from the user group 120, and send a notification to the removed communication device 202 indicating that the communication device 202 was removed from the user group 120 at operation 861.

Figure 8E:
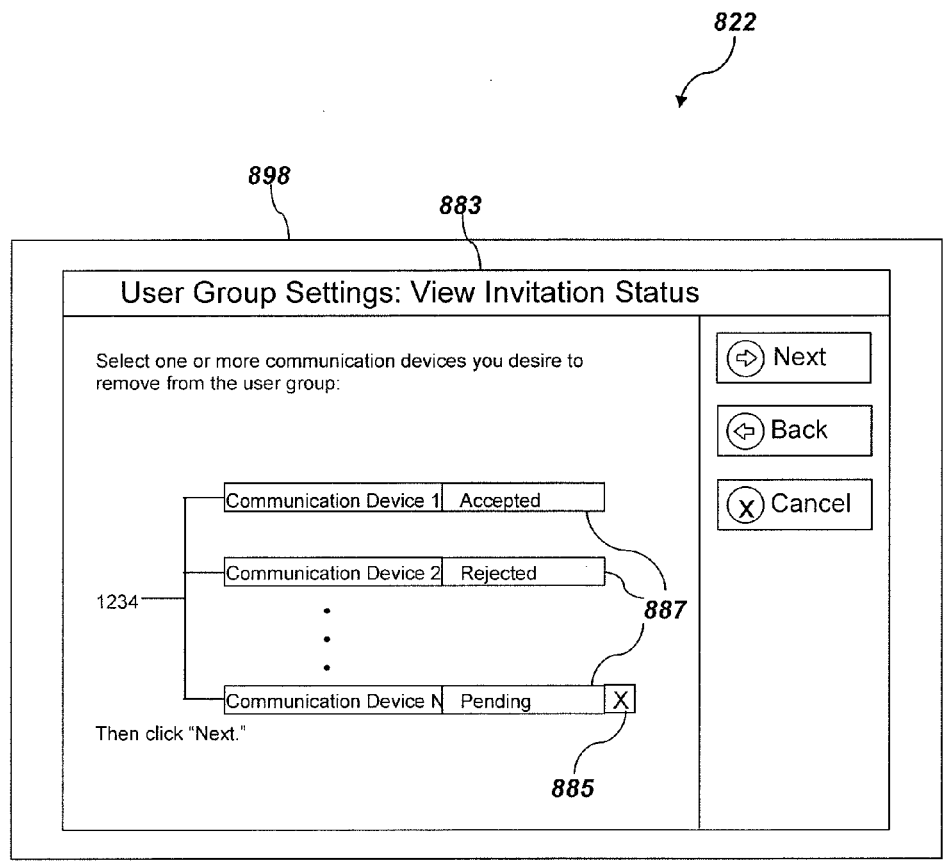

Referring again to FIGS. 8A and 8B, and returning to operation 853, if the user selects the view invitation status option 873, the user interface 822 may present an invitation status message 883 (FIG. 8E) at operation 865. Referring to FIGS. 8A and 8E, the invitation status message 883 may include a status description 887 indicating the status of each communication device 202 that was sent an invitation to join the user group 120. By way of non-limiting example, each status description 887 may be configured to indicate "Accepted" if the corresponding communication device 202 has accepted the invitation to join the user group 120. Also, each status description 887 may be configured to indicate "Rejected" if the corresponding communication device 202 has rejected the invitation to join the user group 120. In addition, each status description 887 may be configured to indicate "Pending" if the corresponding communication device 202 has not accepted or rejected the invitation to join the user group 120. Also For each status description 887 indicating "Pending," the invitation status message 883 may include a cancel invitation option 885 configured to cancel the corresponding invitation to join the user group 120.

While certain illustrative embodiments have been described in connection with the figures, those of ordinary skill in the art will recognize and appreciate that embodiments encompassed by the disclosure are not limited to those embodiments explicitly shown and described herein. Rather, many additions, deletions, and modifications to the embodiments described herein may be made without departing from the scope of embodiments encompassed by the disclosure, such as those hereinafter claimed, including legal equivalents. In addition, features from one disclosed embodiment may be combined with features of another disclosed embodiment while still being encompassed within the scope of embodiments encompassed by the disclosure as contemplated by the inventors.

What is claimed is:

1. A video communication device specifically configured for use by a hearing-impaired user, the video communication device comprising:
   an electronic display;
   a memory having computer-readable instructions stored thereon; and
   a processor operably coupled with the electronic display and the memory, the processor configured to execute the computer-readable, instructions to:
   generate and display a graphical user interface on the electronic display, the graphical user interface configured to enable a user create and administer a user group by:
   prompting user to create a set of group credentials through the graphical user interface for a new user group that includes the video communication device;
   accepting information through the graphical user interface identifying one or more other video communication devices that the user desires to add to the new user group;
   causing invitation to join the new user group to be sent each of the one or more other video communication devices identified by the user through the graphical user interface; and
   causing the one or more video communication devices to be linked to a group unique identifier responsive to the invitation being accepted such that the all video communication devices of the new user group are notified of an incoming video call when the group unique identifier is used by another communication device to place the incoming video call, wherein each of the video communication devices of the new user group are also linked to an individual unique identifier such that only an individual video communication device is notified of the incoming video call when the individual unique identifier is called; and
   causing information to be shared with each video communication device that is part of the user group outside of a call responsive to the invitation being accepted, wherein group information is selected from the group consisting of a group blocked caller list, a group message history, group text messages, group video messages, a group call history, a group address book, and a combination of any thereof;
   receive incoming video calls responsive to the another communication device using the individual unique identifier to place the incoming video call; and
   receive incoming video calls along with the video communication devices of the new user group responsive to the another communication device using the group unique identifier through to place the incoming video call.

2. The video communication device of claim 1, wherein the processor is configured to present a join existing group option through the graphical user interface to enable the user to associate the video communication device with an existing user group responsive to the user selecting the join existing group option and providing a set of group credentials for the existing user group to the graphical user interface.

3. The video communication device of claim 1, wherein the processor is configured to present an agreement through the graphical user interface delineating one or more terms for creating the new user group, and present an accept agreement option and a reject agreement option for the user to select.

4. The video communication device of claim 1, wherein the processor is configured to:
   present a status of each of the invitations through the graphical user interface indicating whether the invitations have been accepted to join the new user group; and enable the user to cancel an outstanding invitation through the graphical user interface.

5. The video communication device of claim 1, wherein the processor is configured to enable a user to remove a video communication device from the new user group that the video communication device belongs to through the graphical user interface such that the removed video communication device is no longer linked with the group unique identifier and the shared group information is no longer accessible by the removed video communication device responsive to being removed from the new user group.

6. The video communication device of claim 1, wherein the incoming video calls are routed through a video relay service configured to assist the hearing-impaired user by providing sign language interpretive services during communication sessions.

7. The video communication device of claim 1, wherein the group information further includes shared settings selected from the group consisting of a number of rings that occurs before going to voice mail, a common voice mail message that is applied to all video communication devices of the new user group.

8. A video communication system, comprising: one or more servers configured to:
address a video communication device with an individual unique identifier assigned to the video communication device such that only the video communication device receives incoming calls placed by another communication device using the individual unique identifier;
create a new user group including a group unique identifier responsive to a user selecting a create new group option on a graphical user interface of the video communication device;
send an invitation to join the new user group to a plurality of different video communication devices selected by the user through the graphical user interface of the video communication device;
address the video communication device and any video communications that accept the invitation with the group unique identifier assigned to the new user group such that all video communication devices of the new user group receive incoming calls placed by another communication device using the group unique identifier;
maintain shared group information for the new user group and providing common access of the shared group information to all video communication devices of the new user group that accept the invitation outside of a call, wherein the shared group information is selected from the group consisting of a group blocked caller list, a group message history, group text messages, group video messages, a group call history, a group address book, and combinations thereof.

9. The video communication system of claim 8, wherein the one or more servers are configured to not address the video communication device with the group unique identifier assigned to the new user group responsive to the user selecting a cancel user group option through the graphical user interface of the video communication device such that all video communication devices of the canceled new user group only receive incoming calls placed by another communication device using their individual unique identifiers and not the group unique identifier.

10. The video communication system of claim 8, wherein the one or more servers are configured to address the video communication device with a new group unique identifier assigned to the new user group.

11. The video communication system of claim 8, wherein the one or more servers are configured to:
retain a prior version of individual information that existed for the video communication devices prior to joining the new user group; and
remove access to the shared group information for any video communication devices that are no longer part of the new user group such that their information reverts back to the individual information that existed prior to joining the new user group.

12. A video communication system comprising:
one or more servers are configured to:
address video communication devices with an individual unique identifier assigned to individual video communication devices such that an incoming call placed by another communication device using the individual unique identifier is sent only to the video communication device to which the individual unique identifier is assigned;
create a new user group including a group unique identifier responsive to a user selecting a create new group option on a graphical user interface of one of the video communication devices;
send an invitation to join the new user group to different video communication devices selected by the user through the graphical user interface of one of the video communication devices; and
address the different video communication devices with the group unique identifier assigned to the new user group as a calling number for all video communication devices that accepted the invitation to the new user group such that an incoming call placed by another communication device using the group unique identifier is sent to all of the different video communication devices that are part of the new user group, wherein the group unique identifier is promoted from a previous individual unique identifier assigned to one of the video communication devices of the new user group, and the video communication device whose individual unique identifier was promoted as the group unique identifier is assigned with a new individual unique identifier.

13. The video communication system of claim 12, wherein the group unique identifier is promoted from the previous individual unique identifier assigned to the video communication device used to create the new user group.

14. The video communication system of claim 12, wherein the group unique identifier is promoted from the previous individual unique identifier assigned to one of the video communication devices in the new user group other than the video communication device used to create the new user group.

15. A method of creating a new user group for a plurality of video communication devices, the method comprising:
presenting a create new group option at a graphical user interface on an electronic display of a first video communication device;
detecting, by a processor of the first video communication device, a selection of the create new group option through the graphical user interface;
receiving, by the processor, information from a user through the graphical user interface, the information identifying underline different video communication devices to be added to a new user group;
sending an invitation from the first video communication device to each of the different video communication devices to join the new user group created by the user through the graphical user interface of the first video communication device; and adding each of the different video communication devices that accept the invitation to the new user group by causing a group unique identifier to be assigned thereto, the group unique identifier linking the first video communication device and the different video communication devices added to the new user group such that they all receive notification of an incoming call placed by another communication device using the group unique identifier;

providing the first communication device and each of the different video communication devices that accepts the invitation to the new user group with common access to shared group information outside of a call, wherein the shared group information is selected from the group consisting of a group blocked caller list, a group message history, group text messages, group video messages, a group call history, a group address book, and combinations thereof; and receiving an incoming call through the one or more servers responsive to another communication device placing the incoming call using either an individual unique identifier assigned to only the first video communication device or the group unique identifier.

16. The method of claim 15, wherein receiving the information from the user through the graphical user interlace comprises receiving the individual unique identifier corresponding to each of the different video communication devices that are selected by the user as members to join the new user group.

17. The method of claim 15, further comprising receiving, by the processor, a description through the graphical user interface of each of the different video communication devices.

18. The method of claim 17, wherein receiving a description of each of the different video communication devices comprises receiving a description of a location of each of the different video communication devices.

19. The method of claim 15, further comprising cancelling the invitation sent to at least one of the different video communication devices responsive to receiving an input from the user through the graphical user interface.

20. The method of claim 15, further comprising enabling the user to cancel the user group through the graphical user interface.

* * * * *